US012560467B2

(12) United States Patent
Treitel

(10) Patent No.: US 12,560,467 B2
(45) Date of Patent: Feb. 24, 2026

(54) APPARATUS AND METHOD FOR DOSAGING POWDERED OR GRANULATED MATERIAL

(71) Applicant: TREITEL CHEMICAL ENGINEERING LTD., Petah Tikva (IL)

(72) Inventor: Sharon Pinhas Treitel, Ramat-Gan (IL)

(73) Assignee: TREITEL CHEMICAL ENGINEERING LTD., Petah Tikva (IL)

( * ) Notice: Subject to any disclaimer, the term of this patent is extended or adjusted under 35 U.S.C. 154(b) by 284 days.

(21) Appl. No.: 18/194,238

(22) Filed: Mar. 31, 2023

(65) Prior Publication Data

US 2023/0236053 A1      Jul. 27, 2023

Related U.S. Application Data

(60) Continuation-in-part of application No. 17/666,935, filed on Feb. 8, 2022, now Pat. No. 11,624,642, which (Continued)

(30) Foreign Application Priority Data

Apr. 3, 2016      (IL) .......................................... 244872

(51) Int. Cl.
*G01F 11/24*      (2006.01)
*B65G 65/48*      (2006.01)
*G01F 15/12*      (2006.01)

(52) U.S. Cl.
CPC .......... *G01F 11/24* (2013.01); *B65G 65/4881* (2013.01); *G01F 15/12* (2013.01)

(58) Field of Classification Search
CPC ...... B65G 65/4881; G01F 11/24; G01F 15/12
See application file for complete search history.

(56) References Cited

U.S. PATENT DOCUMENTS 1,205,088 A      11/1916   Fietsch
1,438,595 A      12/1922   Hale
(Continued)

FOREIGN PATENT DOCUMENTS

CA      2 124 099 A1      9/1995
DE      29 39 561 A1      4/1981
(Continued)

*Primary Examiner* — Frederick C Nicolas
(74) *Attorney, Agent, or Firm* — Vorys, Sater, Seymour and Pease, LLP; Maryellen Feehery Hank

(57) ABSTRACT

An open unit housing is configured for removably and rotatably mounting therein at least a dosage feeder of a dosaging apparatus for dosaging a particulate chemical material when mounted above a body of a liquid material, with an interior of the open unit housing being exposed to ambient conditions. The open unit housing comprises a housing body portion having an interior surface defining a cavity exposed to ambient conditions and having an inlet opening facing upwardly for receiving the chemical material from an external source, and an outlet opening for disposing therethrough dosages of the chemical material. The housing body portion has a front end and an axially opposite rear end, the front and rear ends having inner surfaces that bound the cavity. The rear end has a rear opening configured to allow removable mounting of the dosage feeder therethrough into the cavity, and the front end has a front opening configured to allow a front moving member of the dosage feeder to extend therethrough to be connected to a driving member of the apparatus.

20 Claims, 24 Drawing Sheets

Related U.S. Application Data is a division of application No. 16/090,648, filed as application No. PCT/IL2017/050375 on Mar. 27, 2017, now Pat. No. 11,274,953.

(56) References Cited

U.S. PATENT DOCUMENTS

| | | | |
|---|---|---|---|
| 1,473,187 A | 11/1923 | Kaefer | |
| 2,424,675 A | 7/1947 | Wood | |
| 3,169,668 A | 2/1965 | Ziegler | |
| 3,204,833 A | 9/1965 | Weitzner | |
| 4,316,559 A | 2/1982 | McLemore | |
| 4,538,744 A | 9/1985 | Weissenborn | |
| 4,665,808 A | 5/1987 | Pulvermuller | |
| 4,937,385 A | 6/1990 | Buchholz et al. | |
| 4,938,385 A | 7/1990 | Hayashi | |
| 5,427,694 A | 6/1995 | Rugg | |
| 5,549,060 A | 8/1996 | Schick et al. | |
| 5,619,006 A | 4/1997 | Maus | |
| 5,738,249 A | 4/1998 | Kikuchi et al. | |
| 6,112,942 A | 9/2000 | Deacon | |
| 6,387,251 B1 | 5/2002 | Marsiglietti et al. | |
| 7,083,069 B2 | 8/2006 | Wysong et al. | |
| 7,731,063 B2 | 6/2010 | Rusch | |
| 8,114,298 B2 | 2/2012 | Fishler et al. | |
| 9,198,535 B2 | 12/2015 | Righetti | |
| 9,277,838 B2 | 3/2016 | De Graaff et al. | |
| 9,400,200 B2 | 7/2016 | Rusch | |
| 9,801,330 B2 | 10/2017 | Bent et al. | |
| 10,149,429 B2 | 12/2018 | Cloutier Boily et al. | |
| 11,274,953 B2 * | 3/2022 | Treitel | B65G 65/4881 |
| 11,624,642 B2 * | 4/2023 | Treitel | B65G 65/4881 |
| | | | 222/71 |
| 2004/0060449 A1 | 4/2004 | Reyhanloo | |
| 2005/0023297 A1 | 2/2005 | Zill et al. | |
| 2005/0098586 A1 | 5/2005 | Jensen | |
| 2011/0174344 A1 | 7/2011 | Cerruti et al. | |
| 2012/0048192 A1 | 3/2012 | Little | |
| 2014/0144930 A1 | 5/2014 | Tangorra et al. | |
| 2014/0305970 A1 | 10/2014 | Musumeci | |
| 2014/0329672 A1 | 11/2014 | Colclough, Jr. et al. | |
| 2016/0120113 A1 | 5/2016 | Kowalchuk et al. | |
| 2018/0230997 A1 | 8/2018 | Dearden | |
| 2021/0215157 A1 | 7/2021 | Dawn | |

FOREIGN PATENT DOCUMENTS

| | | | |
|---|---|---|---|
| DE | 40 19 032 A1 | 1/1991 | |
| DE | 10 2012 222 981 B3 | 7/2013 | |
| EP | 1 947 618 A1 | 7/2008 | |
| EP | 2 208 970 A1 | 7/2010 | |
| GB | 1 310 426 A | 3/1973 | |
| GB | 2 109 342 A | 6/1983 | |
| GB | 2 259 910 A | 3/1993 | |
| IT | PR20110077 A1 | 3/2013 | |
| WO | 90/15768 A1 | 12/1990 | |
| WO | 2004/112554 A1 | 12/2004 | |
| WO | 2010/085133 A2 | 7/2010 | |

\* cited by examiner

223''

226

223''

225

223a

23'

226

225

222

228

228A

APPARATUS AND METHOD FOR DOSAGING POWDERED OR GRANULATED MATERIAL

TECHNOLOGICAL FIELD

This invention relates to systems configured to provide metered dosages of a granulated or powdered chemical material, for their subsequent mixture with another material, e.g. with a liquid material in order to obtain a chemical solution of a desired concentration.

BACKGROUND

Granulated or powdered chemical materials are widely used in the industry for preparation of chemical liquid solutions. Granulated or powdered chemical material can be easily stored and transported, compared to similar compounds in a liquid state, and normally have a longer shelf life due to the fact, if stored in a dry environment, they maintain their properties for a very long time. Such granulated or powdered compounds are manufactured to react with water-based or other liquid substances in order to produce a chemical solution of required concentration.

There are known systems for dosaging granulated or powdered chemical material, which use dosing screws or auger rotatably mounted within a coaxial cylindrical chamber at the bottom of a container filled with the material. Given the radial width and the pitch of the auger blades, the rate of rotation and duration of rotation of the screw/auger are used to control the amount of the material disposed into a mixing chamber, located beneath the dosaging system, wherein the material is mixed with a liquid material, for example, water for the purpose of preparing a disinfectant chemical solution, which is continuously injected into a water system or another system that needs to be disinfected. One example of such known system is disclosed in U.S. Pat. No. 6,387,251.

WO 90/15768 discloses another kind of a dosaging system, where instead of a dosage screw, a cylindrical dosage feeder with a plurality of dosage recesses is used rotatably mounted within a cylindrical cavity to provide a plurality of discrete dosages of the material.

GENERAL DESCRIPTION

The presently disclosed subject matter refers to an apparatus for providing dosages of a particulate material such as granulated or powdered material, comprising a dosage feeder with one or more dosage recesses, mounted within a cavity having inlet and outlet openings, the dosage feeder being movable in a pre-determined direction inside the cavity for exposing its recess or each of its recesses to the inlet opening for forming therein a discrete dosage of the particulate material and further moving the dosage towards the outlet opening for disposing therethrough this dosage for its further use.

The apparatus according to the presently disclosed subject matter has a number of unique features identified below in different aspects of the presently disclosed subject matter, each of which contributes in its way to the ability of the apparatus to operate under high exposure to vapors, for increased periods of time, at a higher level of precision compared to known designs, thereby enabling its use in any process involving preparation of a liquid chemical solution, requiring the introduction of precise dosages of a particulate material into a liquid volume.

The features of the apparatus according to different aspects identified below and also other features described in Detailed Description of Embodiments can be combined with each other in any combination, and can be used in corresponding methods of dosaging a particulate material in accordance with further aspects of the presently disclosed subject matter.

Thus, in accordance with one aspect of the presently disclosed subject matter the apparatus can comprise a position indicator for producing signals indicative of position of the recess/es at least with respect to one of the inlet and outlet openings of the cavity, in which the dosage feeder is mounted.

Signals produced by the position indicator can be used by a controller for a number of operations connected where knowledge of the exact amount of material that entered or left the dosage feeder is needed, and/or where the knowledge of the exact position of the recess/es is used for monitoring, calculating and controlling operational parameters of the apparatus, as explained in more detail at the end of the Summary section of the present specification.

The position indicator or at least a part thereof can be connected to the dosage feeder directly or indirectly. Alternatively or in addition, the position indicator or at least a part thereof can be disposed at a location outside the cavity, in which the dosage feeder is mounted.

According to a further aspect of the presently disclosed subject matter, a reference area, which optionally can be a part of the position indicator, and which is to be used for the purpose of position indication, can be configured and disposed in the apparatus so that a position of at least one zone in the reference area is correlated with the position of the at least one recess during the movement of the dosage feeder.

To facilitate the above correlation, the reference area can have a pattern of zones whose number, extension and locations are correlated with those of the at least one recess.

According to a further aspect of the presently disclosed subject matter, such correlation can be facilitated by associating the reference area with a driving member at least indirectly connected with, and configured for, moving the dosage feeder, so that the reference area is movable by the driving member when the latter is used for moving the dosage feeder. More particularly, for the correlation to be achieved it can be ensured that the driving member engages the dosage feeder or a dosage feeder moving member in a single mutual orientation therebetween.

According to a further aspect of the presently disclosed subject matter, the apparatus can comprise at least one cleaning member having a cleaning area and mounted so that at least during the movement of the dosage feeder, the cleaning area is in contact with, and is moved relative to, at least one surface of at least one of the cavity and the dosage feeder, to at least reduce accumulation of the material on this surface.

Surfaces whose cleaning can be provided by the cleaning member/s can be one or each of the following: mutually facing surfaces of the dosage feeder and the cavity, and at least non-recessed areas of the dosage feeder's outer surface, in which the recesses are formed. The cleaning areas can be so disposed relative to the outlet opening of the cavity, as to make sure that material removed thereby from the corresponding surface can fall into the outlet. Such cleaning during operation of the apparatus can result in substantial increase of time, during which the apparatus can be continuously operated.

According to a still further aspect of the presently disclosed subject matter, the apparatus can comprise at least one heating member for heating at least those surfaces of at least one of the dosage feeder and the cavity, which when exposed to vapor, can be subject to condensation. Optionally, the heating member/s can be mounted so as to be spaced from the cavity by a portion of a body, in which the cavity is formed. Alternatively, the heating member/s can be mounted within the dosage feeder or within the cavity.

According to a still further aspect of the presently disclosed subject matter, the apparatus can be in the form of an integral assembly of two units each having its own housing. The housing of one such unit can accommodate components of the apparatus whose operation is associated with their exposure to ambient conditions, e.g. through an inlet and/or outlet in its housing, such as the cavity, the dosage feeder and, optionally, cleaning member/s configured for cleaning at least one surface of at least one of the cavity and the dosage feeder. This unit will be hereafter referred to as an 'open' unit. The housing of the other unit, which will hereafter be referred to as a 'closed' unit, can accommodate components of the apparatus, whose exposure to such conditions is at least not required for its operation. Components accommodated in the housing of such closed unit can be at least one of the following: a driving mechanism, from which movement is transferred to the dosage feeder, a reference area whose position and pattern are correlated with those of the recesses of the dosage feeder, component/s participating in providing such correlation, and a component/s needed for sensing position of at least a part of the reference area. The housing of this unit can thus be fully closed and, optionally, sealed at least during operation of the apparatus. Alternatively, the housing can be not closed and not sealed, but rather measurements can be taken within the housing to prevent direct exposure of its components to conditions, to which components of the open unit are exposed. This alternative option should also be considered as covered by the definition of the unit as being 'closed'.

The above two-unit arrangement can allow the apparatus to be fully assembled at a location remote from a facility where it is to be used, and to be compact and easy for transportation, simplifying its replacement at that facility when necessary. According to a still further aspect of the presently disclosed subject matter, the apparatus can have features, which allow reducing direct exposure to ambient conditions of the recess/es of the dosage feeder, at those time intervals when the apparatus is not in use and at least one recess is free of the particulate material. For this purpose, the dosage feeder can have on its surface which is formed with the recess/es, at least one non-recessed area whose minimal dimension in the direction of movement of the dosage feeder or in the direction perpendicular to the direction of movement, is greater than at least a majority of a dimension of the outlet opening in the same direction. Thus, when the dosage feeder is to be stopped, this can be performed at the moment when at least a majority of the non-recessed area is exposed to the outlet opening, whereby the undesirable exposure to vapor of the recess/es when free of the particulate material, can be essentially reduced. Thus, considering the recess/es as dosage-forming surface/s and the non-recessed area as constituting an outlet-closing surface, the above aspect can be applicable to an apparatus comprising any dosage feeder having any dosage forming and outlet-closing surfaces. Consequently, an apparatus of the above aspect can be defined as comprising at least in operation:

(i) a cavity having an inlet opening facing upwardly for receiving the chemical material from an external source, an outlet opening for disposing therethrough dosages of said chemical material;

(ii) a dosage feeder rotatably located inside said cavity and having at least one dosage-forming surface for forming dosages of said material to be moved, during the rotation of the dosage feeder, towards the outlet opening for disposing dosages therethrough, the dosage feeder further having at least one outlet-closing surface configured to take a plurality of position during said rotation, in one of which it is aligned with the outlet opening preventing exposure of the dosage forming surfaces to the exterior of the apparatus;

(iii) a position indicator disposed outside the cavity and indirectly connected to the dosage feeder, for producing signals indicative of position of said at least one outlet-closing surface at least with respect to said outlet opening, the position indicator comprising a reference member having a reference area configured and disposed so that its position is correlated with the position of said at least one outlet-closing surface during the movement of the dosage feeder; and a sensor for sensing the position of the reference area and providing said signals;

(iv) a driving member connected with, and configured for rotating the dosage feeder so that the reference member is rotatable by the driving member when it rotates the dosage feeder; and (v) a controller configured to receive said signals and to operate the apparatus using said signals.

The cavity and the outer surface of the dosage feeder in any of the above aspects of the presently disclosed subject matter can both be cylindrical, the dosage feeder being coaxial with the cavity and rotatable about their common axis. The cavity can be formed within a housing having an interior surface defining the cavity, an exterior surface, which can also be cylindrical or rather can have any other appropriate shape, and comprise planar or curved exterior surface portions; an inlet and an outlet formed in different portions of such housing and each having corresponding surfaces extending between its inner edge at the interior surface of the housing and its outer edge at the exterior surface of the housing. This surface of the inlet and/or the outlet opening can have an orientation different from being perpendicular to the interior and exterior surfaces of the housing.

More particularly, in accordance with a further aspect of the presently disclosed subject matter the surface of the inlet at least at a front portion thereof relative to the direction of movement of the dosage feeder is inclined so that its outer edge is spaced from its inner edge in the direction of movement of the dosage feeder. The inclination relative to the adjacent area of the interior surface of the dosage feeder can be such as to ensure that when the dosage recess passes by the inlet during its movement in the pre-determined direction, the front portion of the inlet smoothly raises away from the space between the interior surface of the housing and the dosage feeder, facilitating thereby moving the material which has not entered the recess away from that space. Optionally, such inclination can be defined by an angle in the range between 30 and 45 degrees.

According to a still further aspect of the presently disclosed subject matter, the open unit can be assembled to interchangeably accommodate therein at least a first dosage feeder that requires altitudinal spacing between the inlet and outlet of the cavity, and a second dosage feeder that requires longitudinal spacing between the inlet and outlet of the cavity. The housing of the open unit, also referred to herein as the open unit housing, can thus comprise a housing body portion having an inlet opening at the upper portion thereof, a bottom outlet opening at the bottom portion thereof, and a side opening on a side portion thereof perpendicular to the common axis of the dosage feeder and the open unit housing, and spaced therealong from the inlet opening, through which, upon assembly of the apparatus, each of the at least two dosage feeders can be inserted and mounted into the cavity. The inlet opening and outlet opening can constitute the inlet and outlet opening of the cavity when the first dosage feeder is in use, and the side opening can participate in providing the outlet opening of the cavity when the second dosage feeder is in use. The inlet and outlet opening of the cavity can be interchangeably referred to herein as the cavity inlet and outlet opening, respectively.

The apparatus can have a fixation member for releasable fixation thereof to a container configured for holding therein the particulate material to be dosaged and having a bottom, which is open at least during the operation of the apparatus, the fixation member being configured and being mountable to the container so as to allow alignment of the inlet opening of the apparatus with the bottom of the container, when the apparatus is fixed thereto.

The apparatus of any of the above aspects of the presently disclosed subject matter can comprise a controller configured to receive signals from the position indicator and use them for any one or more purposes described below.

In particular, when the particulate material is to be dosaged by the apparatus for its subsequent mixture with and dissolution in a liquid to obtain a liquid solution having a desired concentration of the material, the signals can be used to determine a precise count of discrete dosages produced, so that the accuracy of obtaining the desired concentration can be essentially increased, allowing selecting the desired concentration in advance. In addition, when the particulate material is supplied to the inlet of the apparatus from a container of a known value, knowledge of the precise count of dosages which entered the apparatus can be used by the controller to calculate the amount of material left in the system, which otherwise would need to be provided with sensors for sensing the level of material inside it.

In addition or alternatively, the above signals can be used by a controller to make sure that, when the movement of the dosage feeder needs to be stopped, such stopping is performed when the dosage recess is in a desired disposition with respect to the outlet opening. Namely, this disposition can be such that no recess is fully exposed to the outlet opening, more particularly, that at least a majority of a recess closest to the outlet opening at the time of stopping is not exposed to the outlet opening. This can allow essentially reducing or preventing direct exposure of the recesses of the dosage feeder to ambient conditions comprising vapor through the outlet opening, keeping it free of moisture and thus ready for future use.

In addition or alternatively, the above signals can be used by a controller to monitor change in a rate of movement of the dosage feeder. Such change in the movement rate can be an indication of an obstructing condition on one or more components of the apparatus participating in the movement of the dosage feeder during its operation, which can take place, for example, due to accumulation of particles of the particulate material on surfaces of these components. Therefore, when the above change has been identified, the controller can instruct the apparatus to reverse the direction of movement of the dosage feeder in an attempt to remove the obstructing condition and/or to stop the operation of the apparatus. Reversing the direction of movement from the operational to an non-operational direction can also be useful for improving effectiveness of cleaning by the cleaning members and thus extend the time required to eventually replace the apparatus for maintenance due to extreme accumulation of debris and solid particles in the space between the cavity and the dosage feeder of the open unit.

The above described uses of signals indicative of position of the recess/es at least with respect to one of the inlet and outlet openings of the cavity, in which the dosage feeder is mounted, each constitute a separate aspect of the presently disclosed subject matter. In addition, each such use constitutes a part of a method of dosaging particular material by means of an apparatus according to any aspect of the presently disclosed subject matter or any other apparatus.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1:
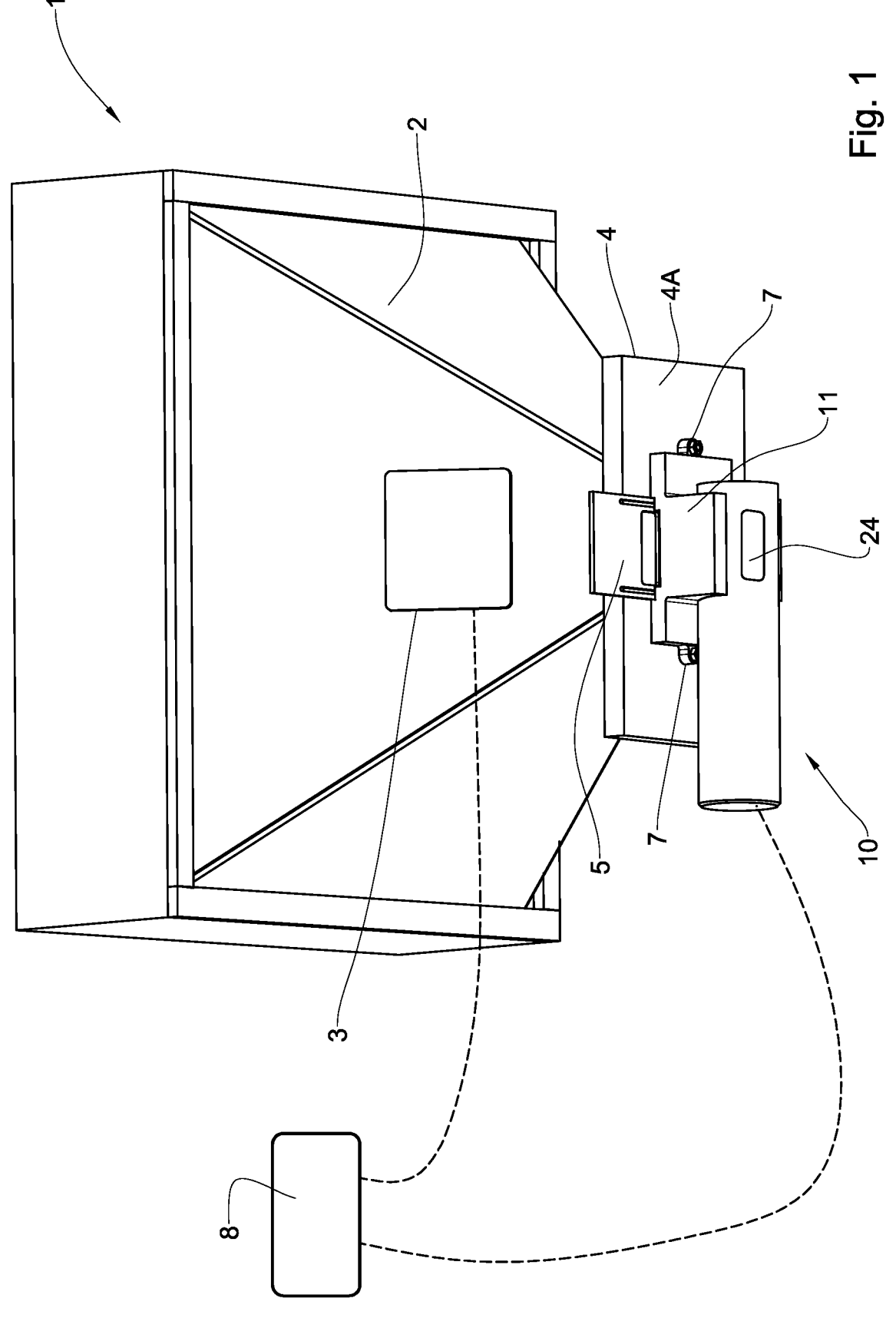
FIG. 1 is a schematic perspective bottom view of one example of a system, in which an apparatus according to the presently disclosed subject matter can be used.
Figure 2:
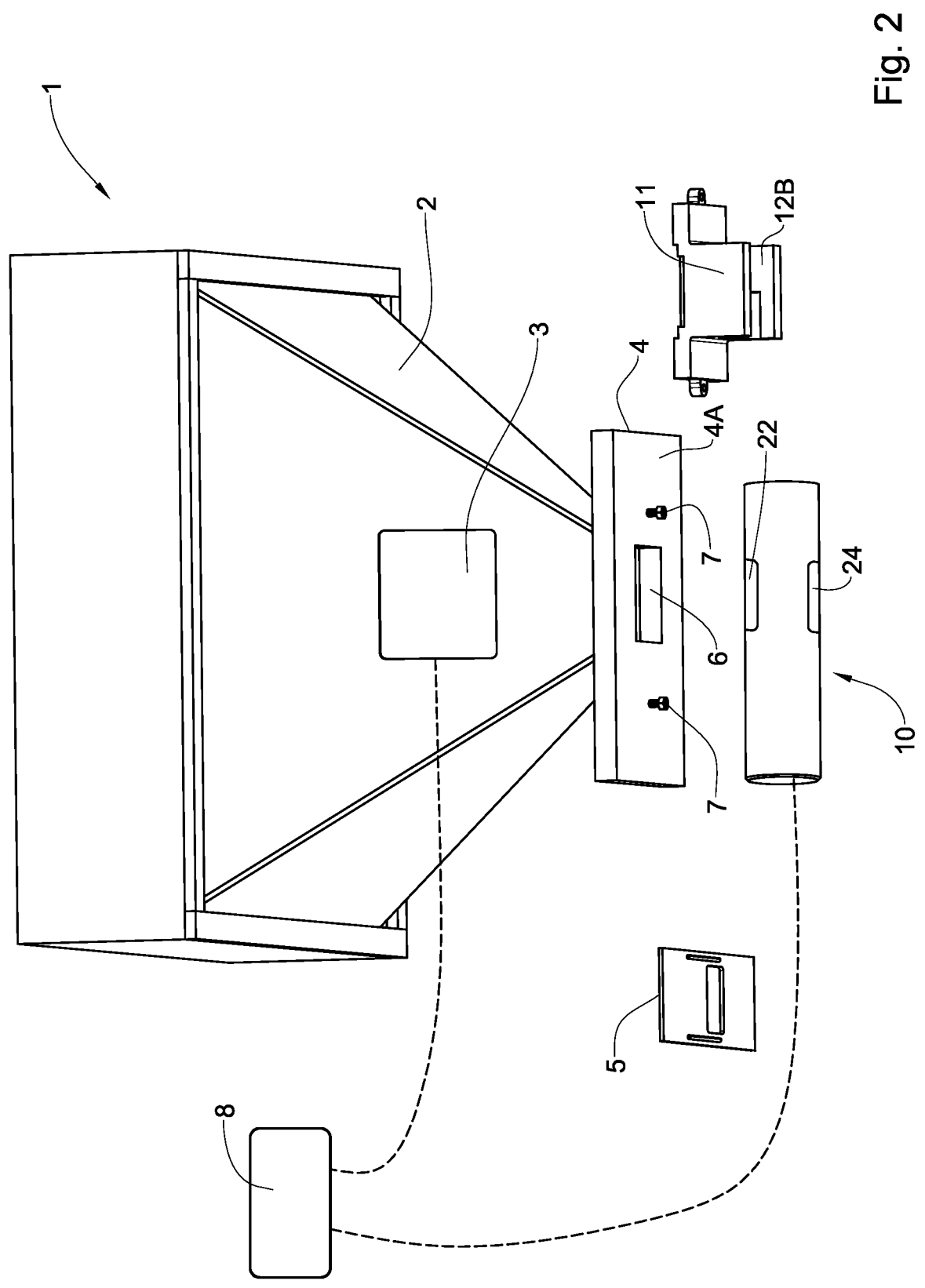
FIG. 2 is a schematic exploded view of the system shown in FIG. 1.

FIGS. 1 and 2 illustrate schematically one example of a system, in which an apparatus according to an embodiment of the presently disclosed subject matter can be used. The system generally designated at 1 can be of a kind, where predetermined dosages of a first, granulated or powdered chemical material whose particles have a minimal dimension d, are provided for their further mixture with and dissolution in a second, liquid material to obtain a liquid solution having a desired concentration of the first material. The granulated/powered material will hereinafter be generally referred to as a 'particulate material'.

More particularly, the system 1 can be of a kind configured for being mounted above a body of the liquid material (not shown), in consequence of which the particulate material, especially when it is disposed in a part of the system close to the body of liquid, can be exposed for prolonged periods to vapor and moisture originating from the liquid material, whose reaction with the particulate material can result in solidification of particles of the material and their accumulation on components of that part of the system.

As shown in FIGS. 1 and 2, the system 1 comprises a funnel-shaped container 2 for holding therein the particulate material to be dosaged, and an apparatus 10 according to one example of the presently disclosed subject matter, for receiving this material from the container 2 and forming discrete dosages thereof.

As best seem in FIG. 2, the container 2 has an open bottom (not designated), and a holder 4 with a corresponding disposal opening 6 configured for securely holding the apparatus 10 in fixed position relative to the disposal opening. Any suitable fixation arrangement can be used for such purpose. In the described example, this arrangement comprises a fixation member 11 having a lower portion 12B configured to securely hold the apparatus 10 and an upper portion 12C configured for being fixed to a lower surface 4A of the holder 4, by any suitable means such as e.g. by fixation screws 7 received within corresponding fixation holes (not seen) formed in the holder 4 on opposite sides of the disposal opening 6 and spaced therefrom.

Figure 3:
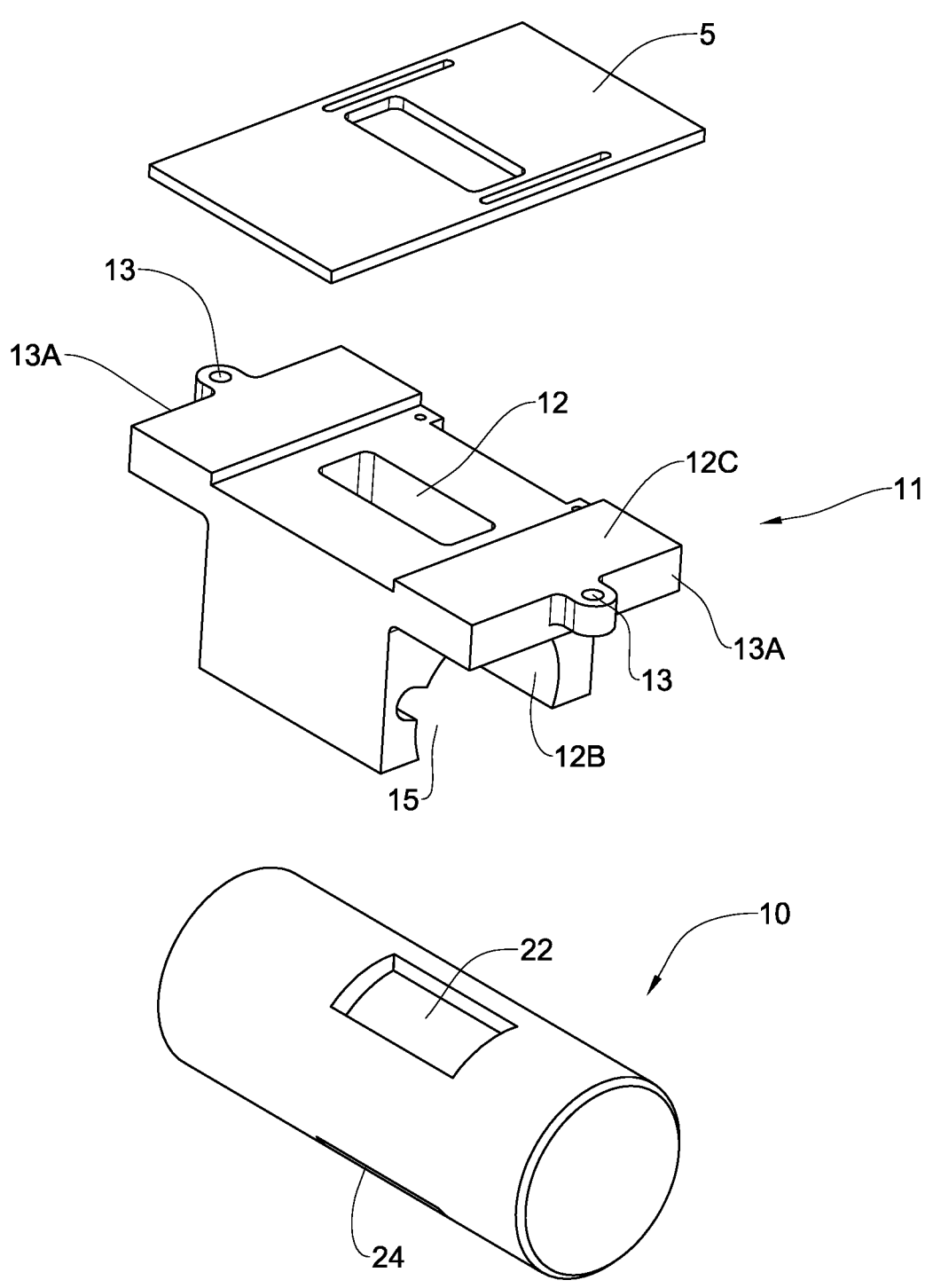
FIG. 3 is a schematic exploded view of a fixation member according to one embodiment of the presently disclosed subject matter, by virtue of which an apparatus according to the presently disclosed subject matter can be held in place in the system shown in FIGS. 1 and 2.

With reference to FIG. 3, the fixation member 11 is formed with an aperture 12, which during operation, is aligned with the disposal opening 6 of the holder 4, allowing passage therethrough of the particulate material. The upper portion 12C of the fixation member 11 is configured to slidingly receive therein a sliding door 5 for closing the aperture 12 when passage of material from the container 2 to the apparatus 10 is not desired, and exposing the aperture 5 to the disposal opening 6 of the container 2 to allow the flow therethrough of the material towards the apparatus 10. In addition, the upper portion 12C of the fixation member 11 is configured for attachment thereof to the lower surface 4A of the holder 4. In the described example, the fixation member 11 is formed for this purpose with two fixation slots 13 located in two flanges 13A of the fixation member configured to receive therewithin bolts 7 which are to be fastened into the fixation screw holes on the holder's lower surface 4A. The lower portion 12B of the fixation member 11 is formed with a fixation member cavity 15 corresponding in shape and dimensions to an exterior shape of the apparatus 10 and configured to securely hold the apparatus 10 therewithin. Such fixation can be performed using screws, pins or any other suitable components.

The apparatus 10 has an inlet opening 22 facing upwardly formed in an upper portion of its body for receiving therein the particulate material and an outlet opening 24 facing downwardly formed in a lower portion of its body for disposing therethrough dosages of the material. Once the apparatus 10 is assembled and attached to the fixation member 11, and the fixation member 11 is fixed on the holder 4, the disposal opening 6 of the holder, the aperture 12 of the fixation member 11 and the inlet opening 22 of the apparatus 10 are aligned so that the inlet opening 22 is fully exposed to the aperture 12 and the disposal opening 6 respectively, at least during operation of the system. The particulate material dosage by the apparatus 10 during its operation, is disposed through the outlet opening 24 of the apparatus 10 for its further use, e.g. as described above with reference to FIGS. 1 and 2.

The system 1 can further comprise a vibrator used to shake the container and the material therein, in order to allow a continuous and unobstructed flow of the material towards the disposal opening 6. Such vibrator can be attached to one of the walls of the funnel-shaped container 2 as schematically shown at 3 in FIGS. 1 and 2.

The operation of the system and, particularly, of the apparatus 10, is performed under the control of a controller 8 operatively connected to the apparatus 10, to produce discrete dosages of the particulate material, allowing each dosage to fall under the influence of gravity into a volume of a liquid chemical material (not shown) located under the outlet opening 24 of the apparatus. The controller can also control a process, in which dosages of the particulate materials disposed from the apparatus 10 are to be used.

Figure 4:
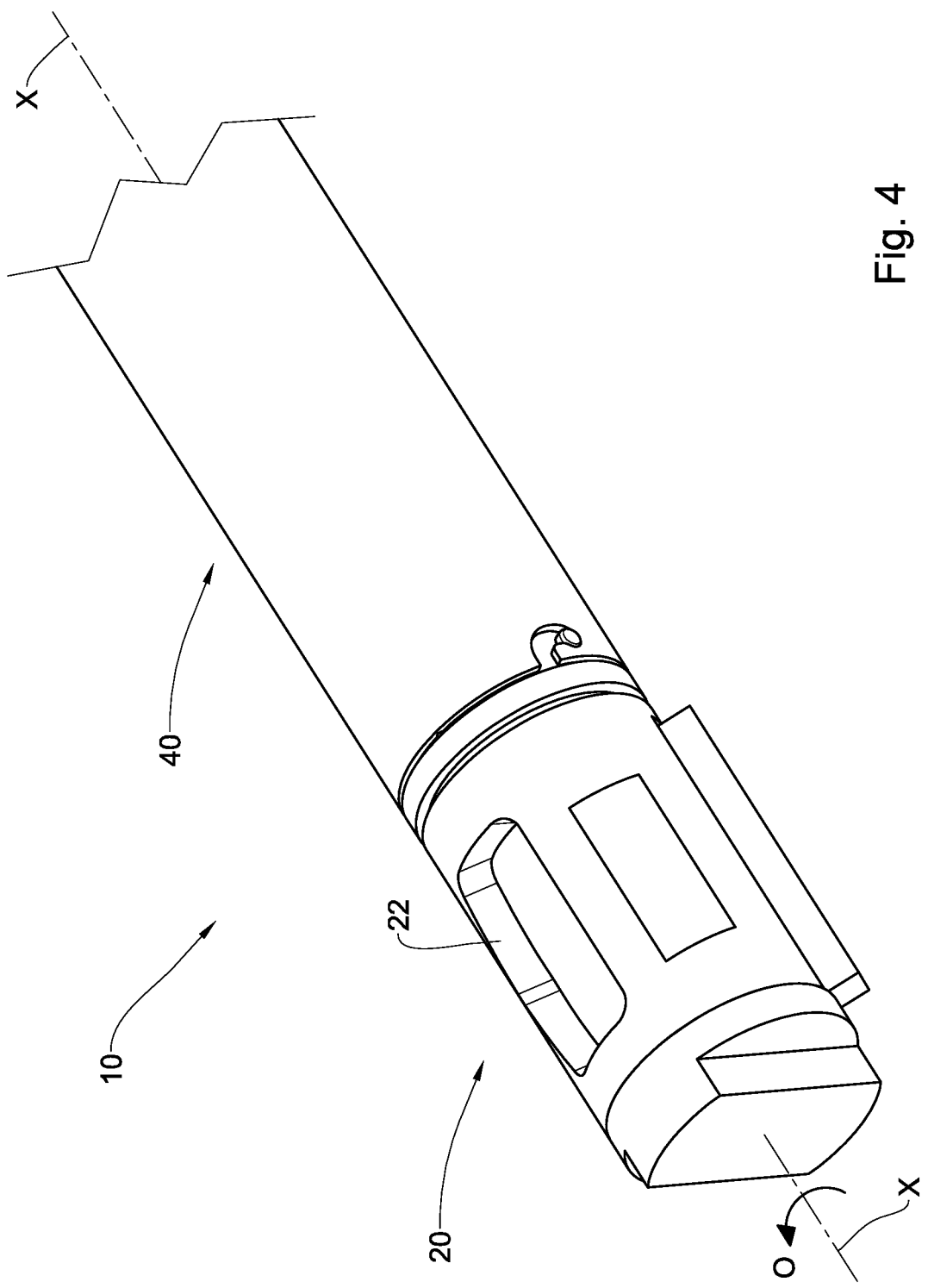
FIG. 4 is a schematic perspective top view of an apparatus according to one embodiment of the presently disclosed subject matter.
Figure 5:
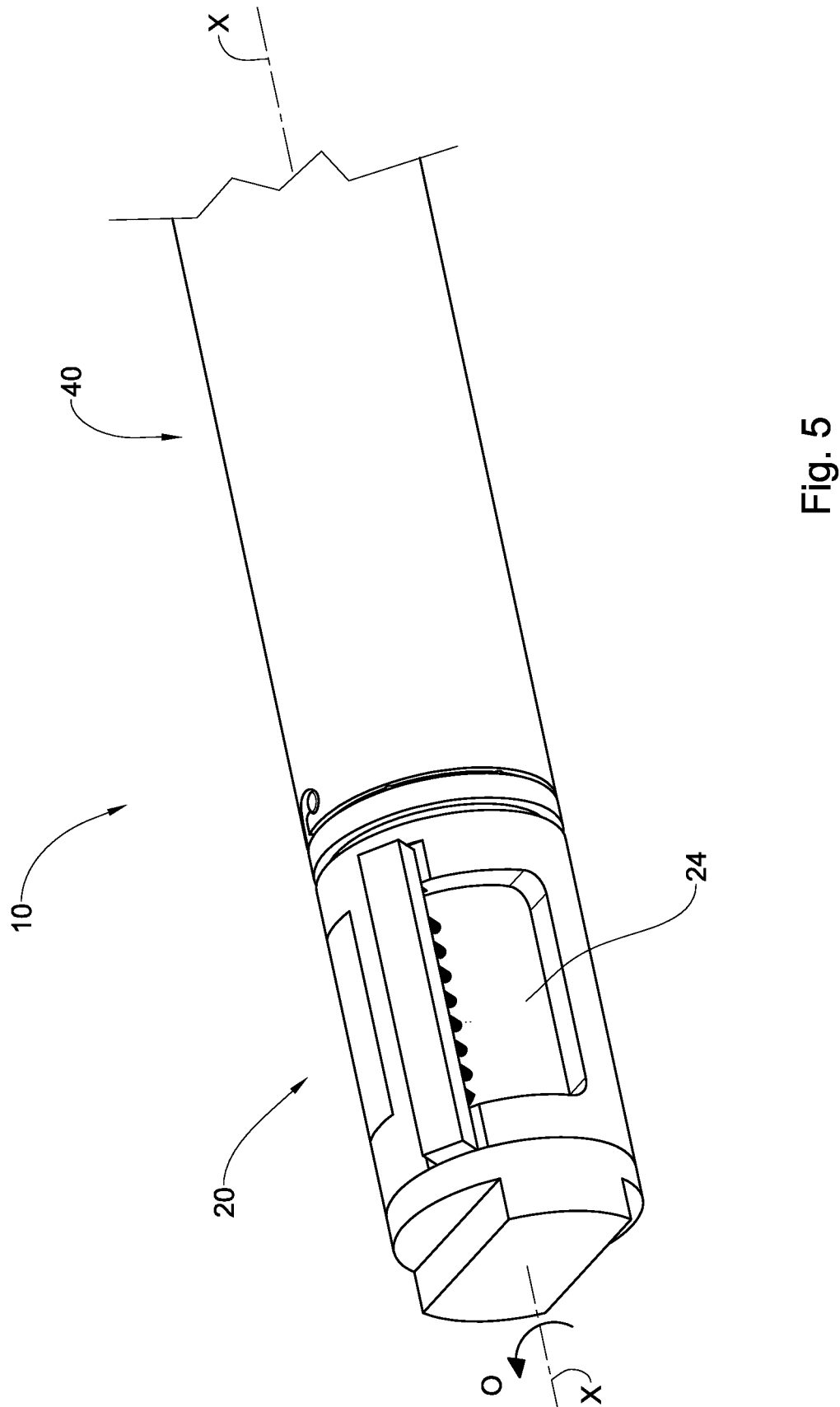
FIG. 5 is a schematic perspective bottom view of the apparatus shown in FIG. 4.
Figures 6, 7:
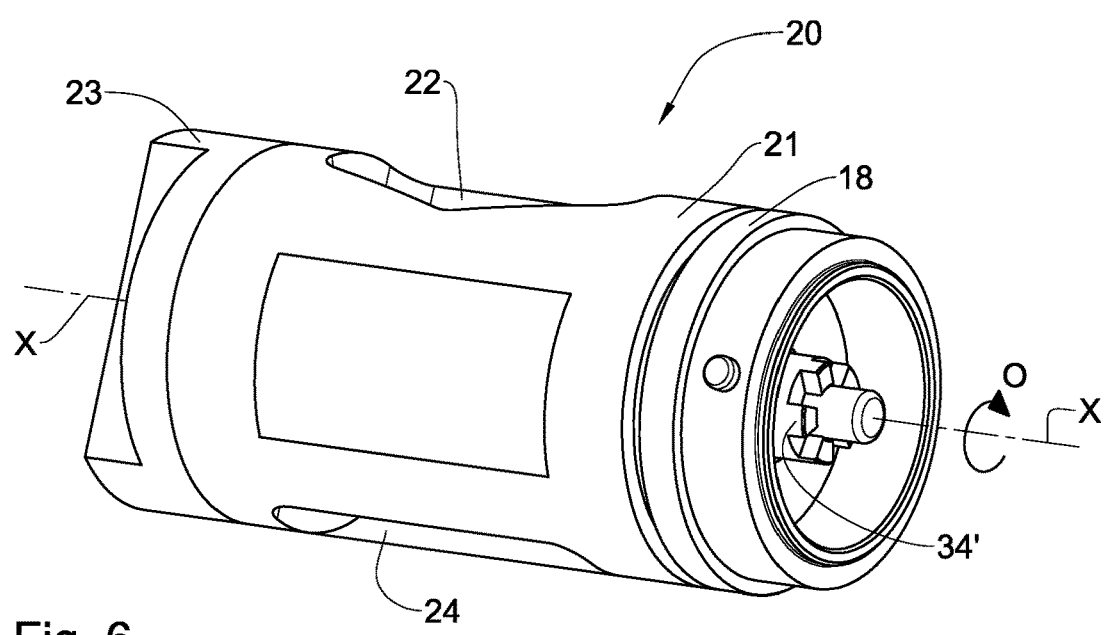
FIG. 6 is a schematic perspective side view of an open unit of the apparatus shown in FIGS. 4 and 5.
FIG. 7 is a schematic exploded view of the open unit shown in FIG. 6.
Figure 17:
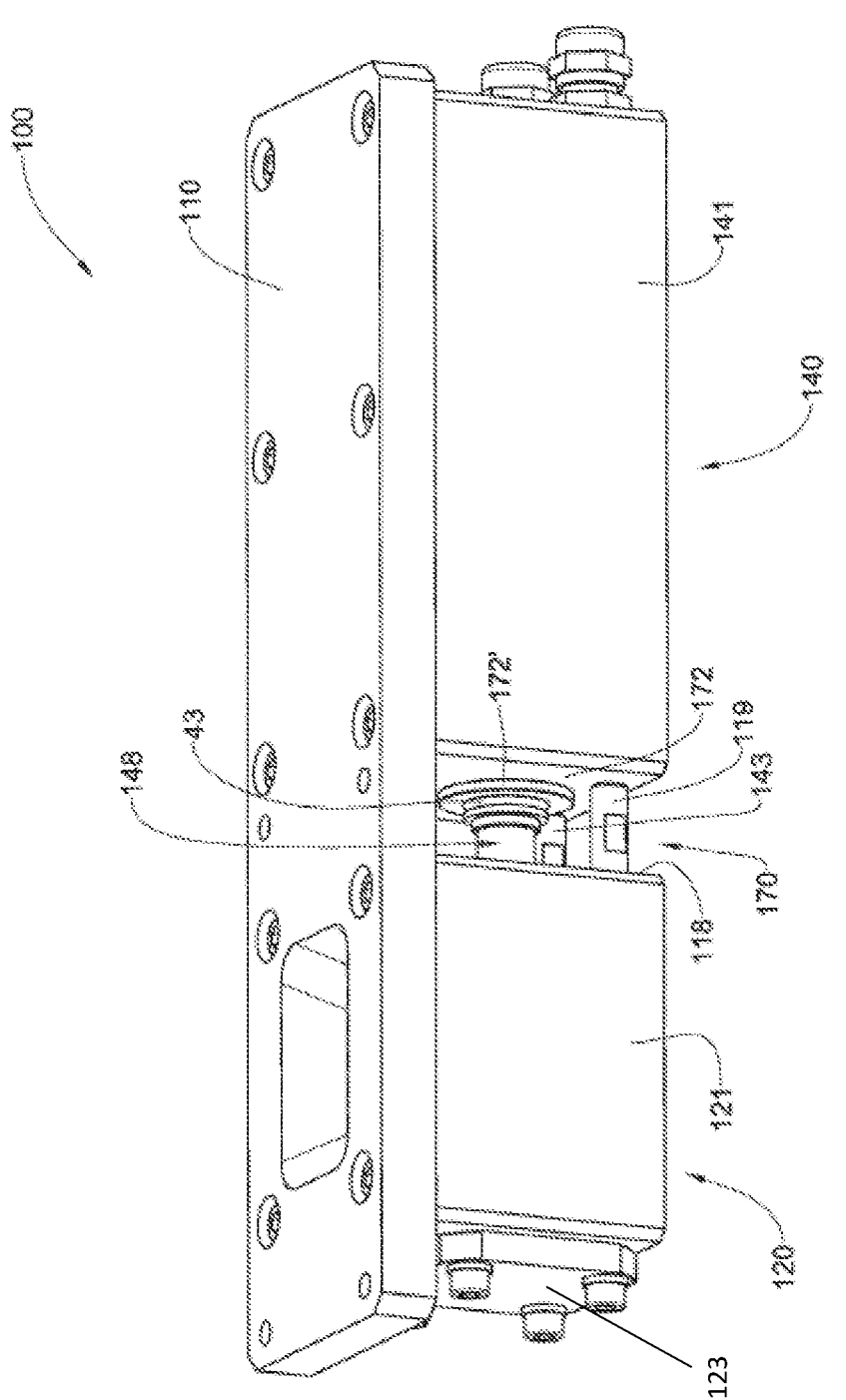
FIG. 17 is a schematic perspective view of an apparatus according to a further embodiment of the presently disclosed subject matter.

FIGS. 4 to 6 show the apparatus 10 without its fixation member 11 shown in FIGS. 1 to 3. As seen in FIGS. 4 to 6, the apparatus has a central longitudinal axis X and comprises an open unit 20 and a closed unit 40 each having a cylindrical external shape. The open unit 20 is formed with the inlet opening 22 and outlet opening 24, and is configured for attachment thereto of the fixation member 11 described with reference to FIG. 3. It should be indicated that, in general, each of the open and closed units or both of them can have a shape other than cylindrical, and the fixation member can be attached to any or both of them. In this connection, reference is made to FIG. 17, illustrating an apparatus 100 according to another example of the presently disclosed subject matter, where each of the open and closed units 120 and 140, respectively, is in the form of a rectangular box, and the fixation member 110 is in the form of a plate attached to both units.

The unit 20 is referred hereinafter as the 'open' unit because its interior is exposed to the ambient conditions at least by virtue of its outlet opening 24, whilst the unit 40 will be referred to as the 'closed unit' as at least a part of its interior is configured for being sealed and thus isolated from the ambient conditions.

With reference to FIGS. 6 and 7 to 8D, the open unit 20 comprises a housing (shown separately in FIGS. 11A to 11C) having a body portion 21 with the inlet opening 22 and the outlet opening 24, and a dosage feeder 31 (shown separately in FIGS. 10A to 10C) mounted within the housing body portion 21 so as to be rotatable about the central axis X at least in an operational direction O.

In a further description of the open unit, the housing and the dosage feeder, the central axis X and the operational direction O of rotation of the dosage feeder will be used to define axial and circumferential front and rear directions. In particular, in the description of elements arranged at different locations along the central axis X, the front location is the one disposed closer to the closed unit than the rear location, and in the description of elements disposed at different locations on a curved circumference, the front location is the one that is disposed further along the operational direction O than the rear location.

Figure 8B:
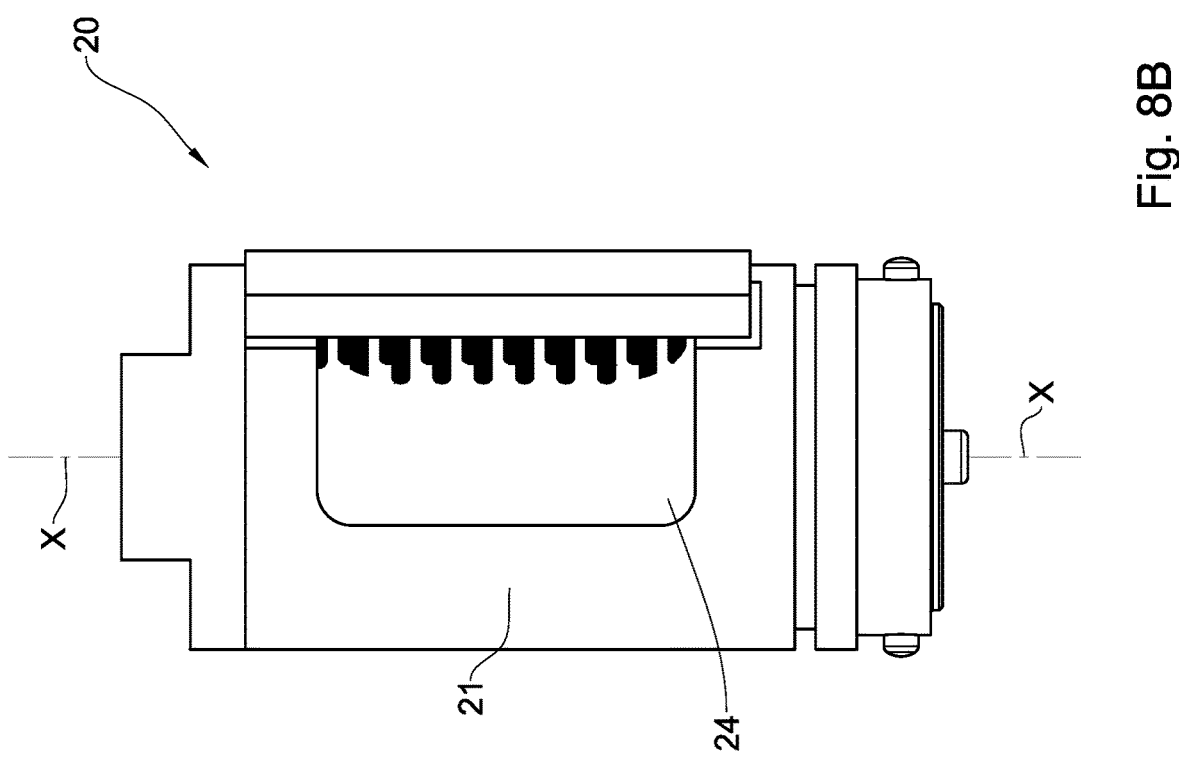
FIG. 8B is a schematic bottom view of the open unit shown in FIG. 6, in which a dosage feeder is in such a position that none of its dosage recesses is exposed to the outlet opening.
Figure 8A:
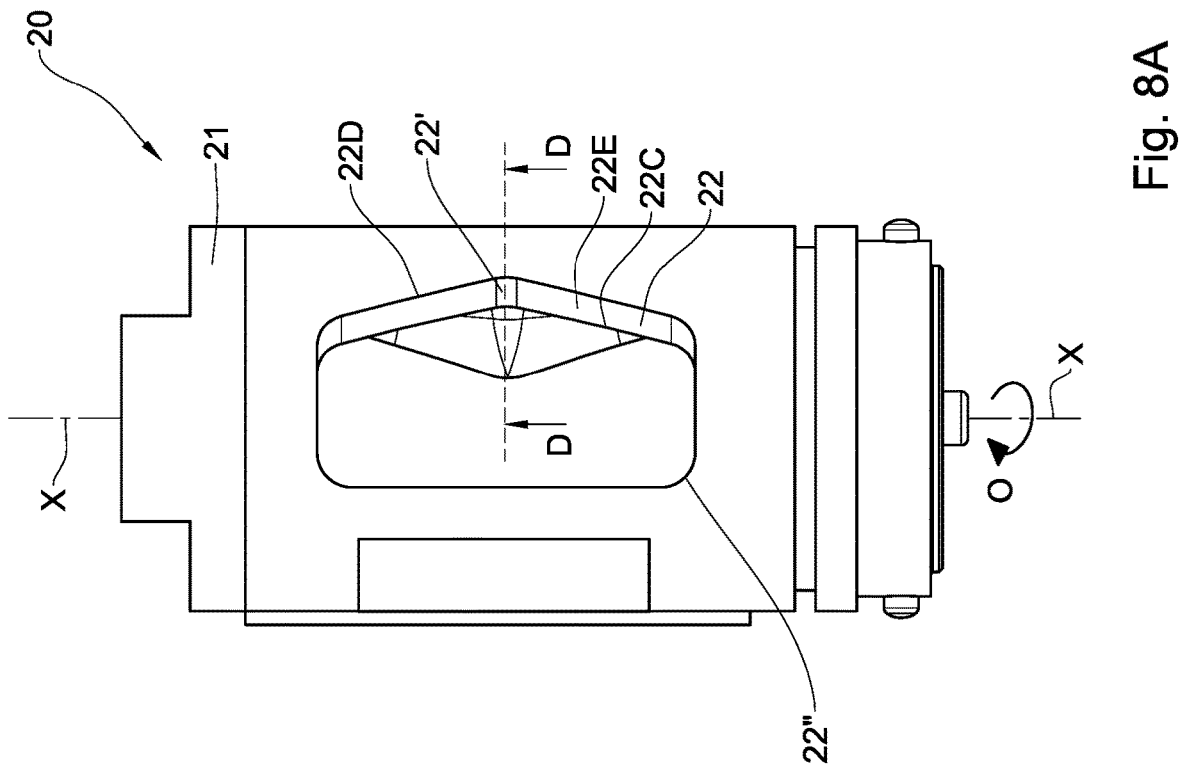
FIG. 8A is a schematic top view of the open unit shown in FIG. 6, in which a dosage feeder is in such a position that one of its dosage recesses is partially exposed to the inlet opening.
Figures 8C, 8D, 9A, 9B:
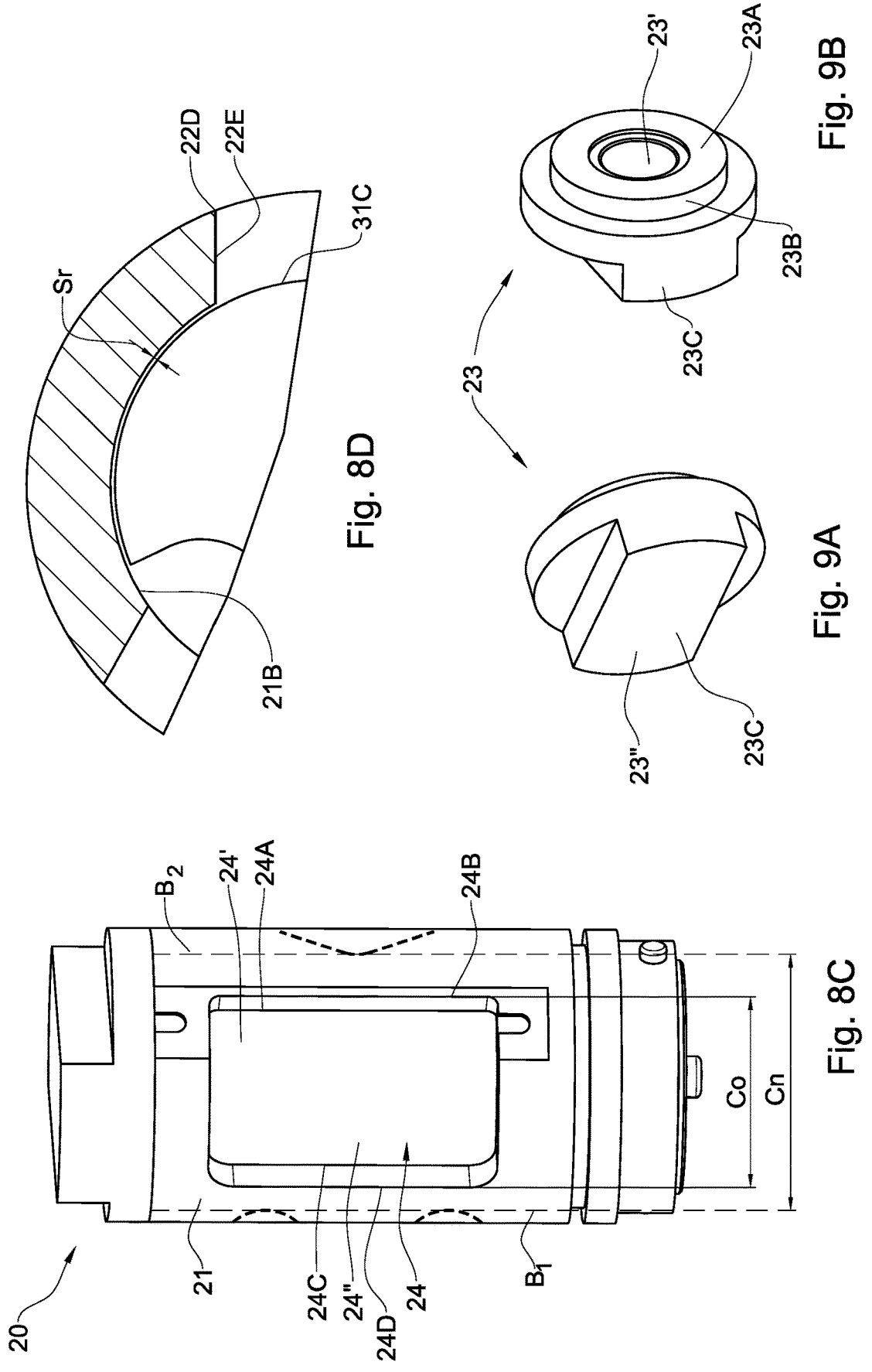
FIG. 8C is the same view of the open unit as that shown in FIG. 8B, with a side cleaning member seen in FIG. 8B being removed.
FIG. 8D is a cross-sectional view of the open unit shown in FIG. 8A, taken along a plane D-D perpendicular to a central axis X of the apparatus.
FIGS. 9A and 9B are respective schematic perspective front and rear views of a removable cover of the open unit shown in FIGS. 7 to 8C.
Figure 11A:
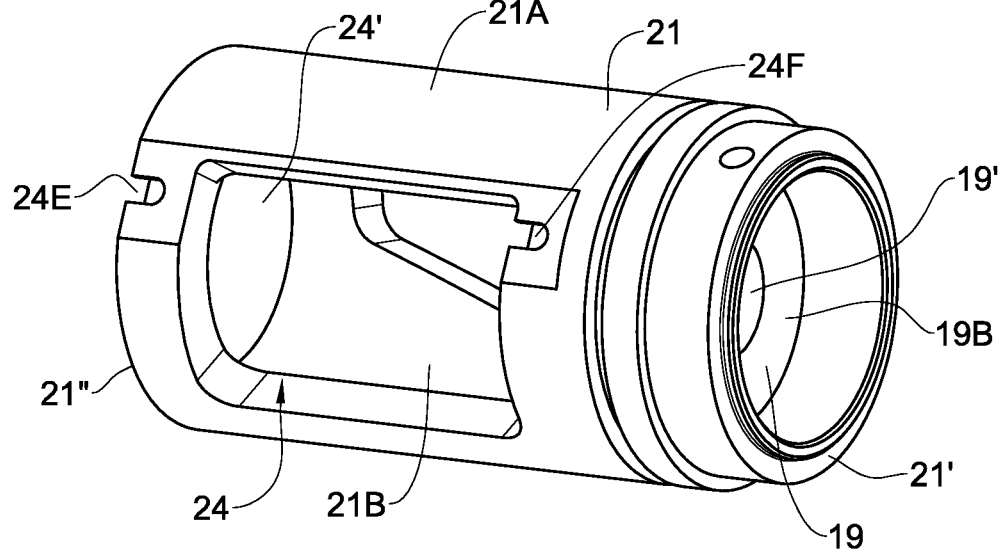
FIGS. 11A and 11B are schematic perspective front and rear end views of a cylindrical housing of the open unit shown in FIGS. 7 to 8C, with its entire outlet opening being seen.
Figure 11B:
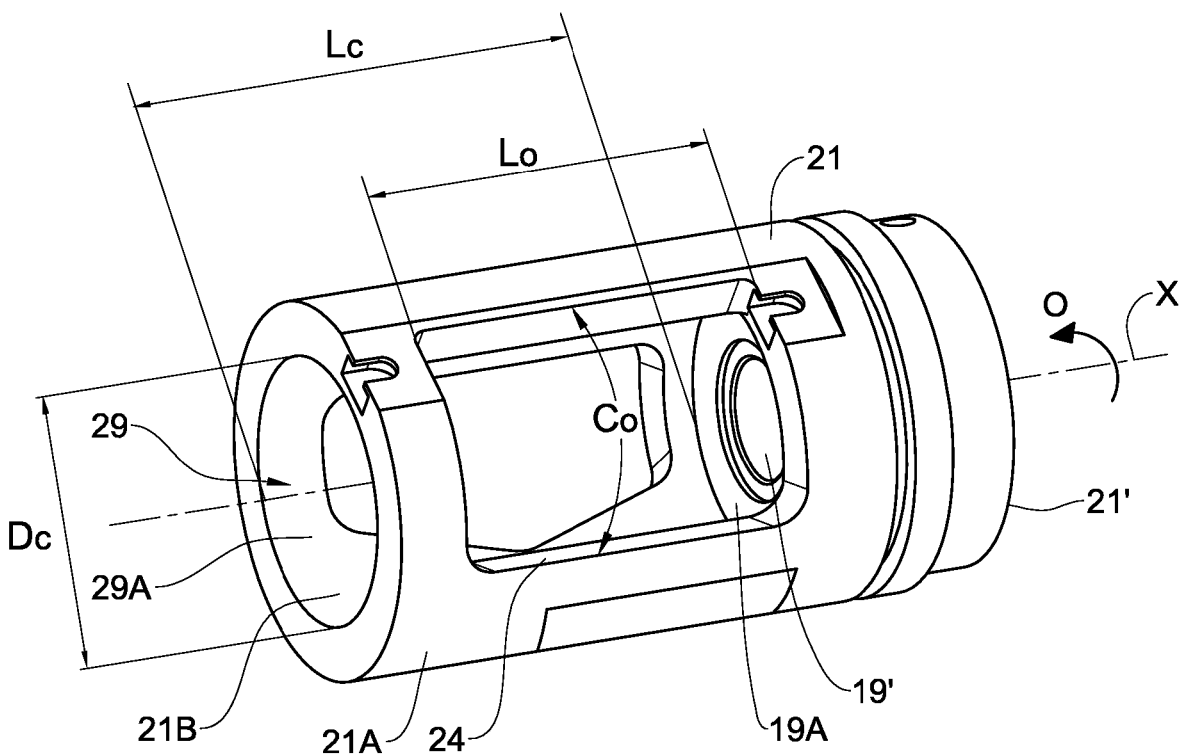
Figure 11C:
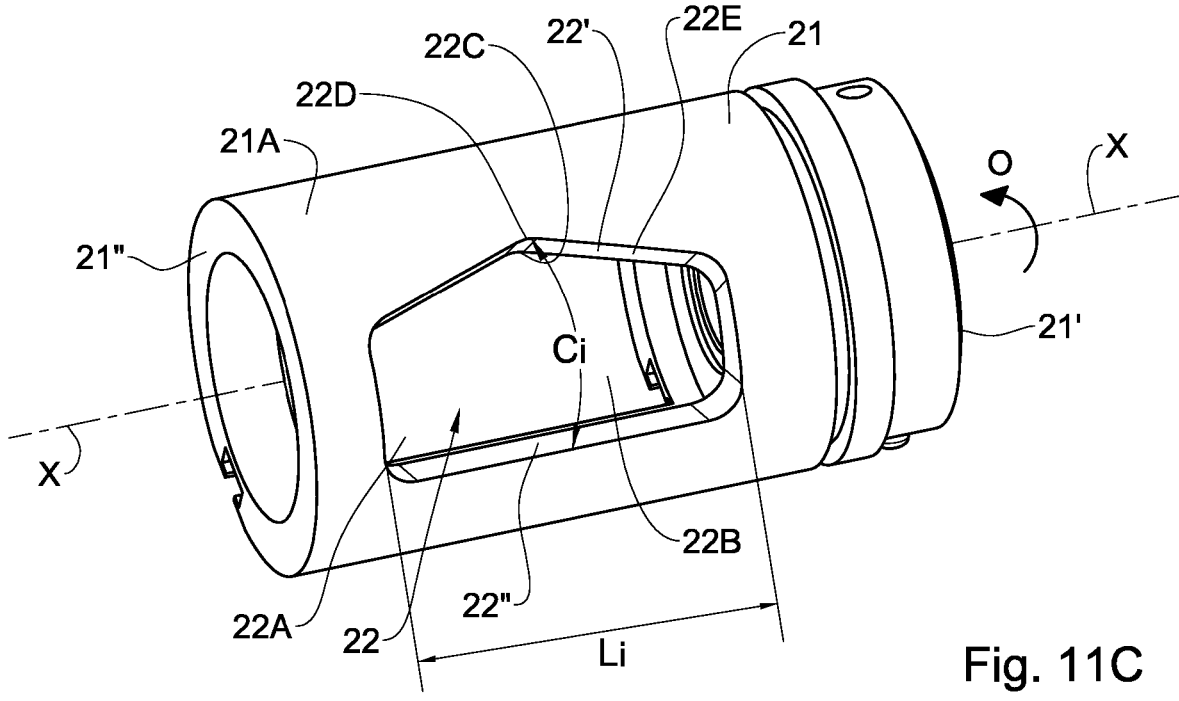
FIG. 11C is a schematic perspective rear view of the cylindrical housing shown in FIGS. 11A and 11B, with its entire inlet opening being seen.

As shown in FIGS. 11A to 11C, the housing body portion 21 has an exterior surface 21A, an interior surface 21B, a front end 21' in the form of an annular wall 19 and an axially opposite rear open end 21" configured to be securely closed by a removable cover 23 when the open unit 20 is assembled (shown separately in FIGS. 9A and 9B). In the described example, the exterior and interior surfaces of the housing body portion are cylindrical, and the housing further comprises a connection ring portion 18 (best seen in FIG. 11B) separated from the housing body portion 21 by the annular wall 18.

The annular wall 19 has an inner surface 19A and the cover 23 has a feeder facing portion 23B with an inner surface 23A such that, when the open unit is assembled, the interior surface 21B of the housing body portion 21 is bound at its two sides by the inner surfaces 19A and 23A, thereby forming in the body portion 21 a cylindrical cavity 29 having a diameter Dc of the interior surface 21B and a length Lc along the axis X corresponding to the distance between the inner surfaces 23A and 19A which thus constitute cavity end surfaces. The annular wall 19 further has a central opening 19' (also referred to herein as a front opening) extending between its inner surface 19A and outer surface 19B, and the cover 23 further comprises a pocket 23' formed in its body and extending inwardly from the inner surface 23A (FIG. 9B), and an outwardly facing head portion 23C with a protrusion 23" (FIG. 9A).

Reverting to FIG. 7, the open unit 20 is configured for use in such orientation that its inlet opening 22 faces upwardly for receiving the particulate material and its outlet opening faces downwardly for disposing therethrough dosages of the material under the influence of gravity. In this orientation, the inlet opening 22 is disposed in an upper portion of the housing body 21 and the outlet opening 24 is disposed in a lower portion of the housing body 21, both openings extending radially between its exterior and interior surfaces.

With reference to FIG. 11C, the inlet opening 22 has a curved front portion 22' opposite a rear portion 22". The curved front portion 22' has a converging shape so that its lateral areas 22A are disposed closer to the rear portion 22" than its central area 22B. In addition, the front portion 22' has a funnel shape so that its front inner edge 22C at the interior surface 21B of the housing body 21, is disposed at the rear of its front outer edge 22D at the exterior surface 21A of the housing body 21. In other words, the surface 22E of the front portion 22' of the inlet opening 22 extending between its front inner and outer edges 22C and 22D raises continuously from the interior surface to the exterior surface of the housing body, away from the space between the housing interior surface 21B and the outer surface of the dosage feeder 31 adjacent the front portion 22" of the inlet opening, forming with the interior surface an acute inclination angle. This angle can, for example, be in the range between 30 to 45 degrees.

The inlet opening 22 and, particularly, each of its front and rear portions, does not necessarily need to have a shape as described above and shown in the drawings. In particular, its shape as seen in a plan view, can vary and it can, for example, be rectangular, parallelogram, trapezoid, elliptical or semi-elliptical or any other desired shape symmetric or asymmetric relative to the axis X. One example of the asymmetric inlet opening can be seen in FIG. 24B, illustrating a portion of an open unit housing according to another embodiment of the presently disclosed subject matter.

The outlet opening 24 has a front portion 24' with a front inner edge 24A and a front outer edge 24B, and a rear portion 24" with a rear inner edge 24C and inner outer edge 24D. The outlet opening 24 can have any desired shape, as viewed from a plan view. In the described example, the outlet opening 24 is substantially rectangular.

As shown in FIGS. 11B and 11C, the inlet and outlet openings have respective circumferential extensions Ci and Co between their front and rear edges and axial lengths Li and Lo, measured along the interior surface 21B of the housing body 21.

The dosage feeder 31 will now be described with reference to FIGS. 10A and 10B. As mentioned above, it is configured for being coaxially mounted inside the cylindrical cavity 29 so as to be capable of rotation about the axis X at least in the operational direction O. The dosage feeder has a feeder front flange 31A, an axially opposite feeder rear flange 31B and a cylindrical outer surface 31C therebetween having a diameter Df larger than the corresponding dimension of the outlet opening 24 (which is the circumferential dimension Co of the outlet opening as seen in its plan view) and a length Lf along the axis X, which is smaller than the length Lo of the outlet opening 24.

Figure 10A:
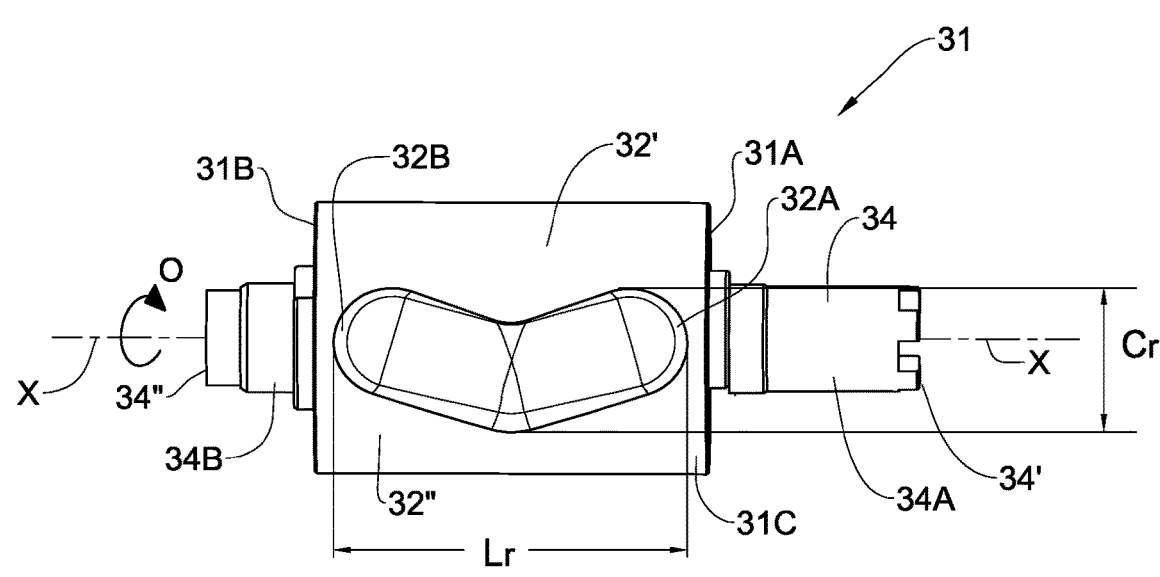
FIGS. 10A and 10B are schematic perspective views of a dosage feeder of the open unit shown in FIGS. 7 to 8C, as seen in a direction facing a recess and a non-recessed zone of the dosage feeder, respectively.

Referring to FIG. 10A, the feeder outer surface 31C is formed with two opposite identical dosage recesses 32 (only one being seen) axially spaced from the two flanges of the feeder and circumferentially spaced from each other by identical non-recessed zones 32' and 32".

Figure 10B:
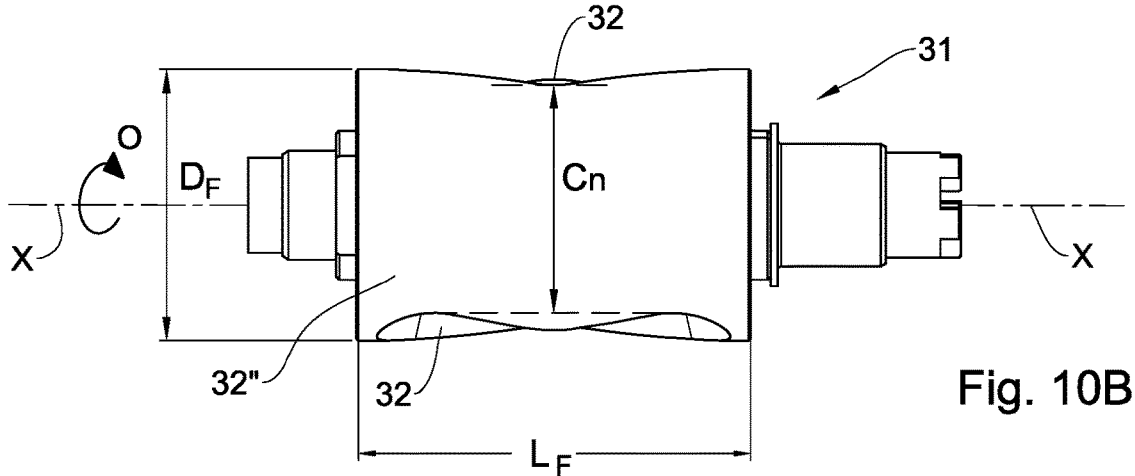

As shown in FIG. 10B, each non-recessed zone 32', 32" of the outer surface 31C extends along the entire length Lf of the outer surface 31C of the dosage feeder and has a circumferential extension Cn, whose minimal value is at least not less and, optionally, greater than the corresponding extension Co of the outlet opening 24. This is illustrated in FIG. 8C, where imaginary boundaries B1 and B2 of the non-recessed zone 32' that are parallel to the axis X and pass via areas of the recesses 32 closest to each other in the circumferential direction, are shown in dotted lines.

With reference to FIG. 10A, each recess 32 is elongated along the axis X and has, at the outer surface 31C, a maximal length Lr, which is smaller than that of the inlet opening 22 and smaller than that of the outlet opening 24, and a circumferential extension Cr, whose maximal value along the outer surface 31C is small enough to ensure that the circumferential extension Cn of the non-recessed zones 32' and 32" is as described above and, on the other hand, is large enough to provide a desired volume of the recess defining the quantity of the particulate material in each dosage to be formed thereby.

Figure 10C:
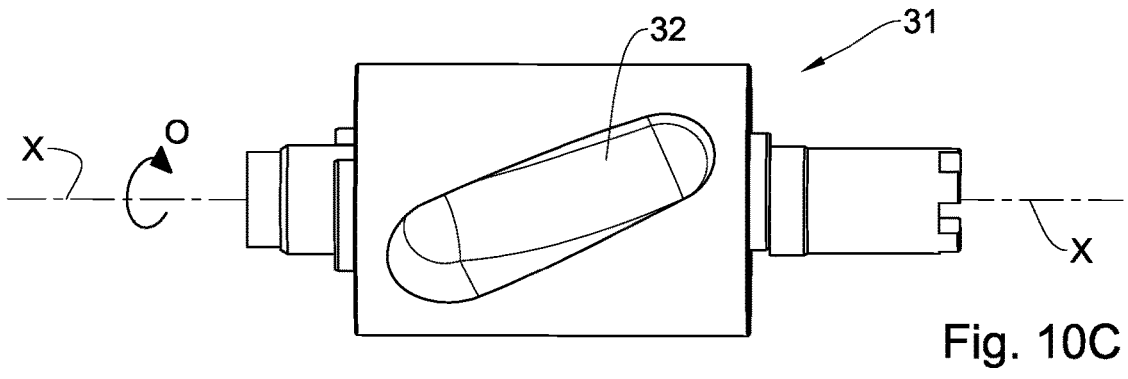
FIG. 10C is a schematic perspective view of a dosage feeder according to another example of a presently disclosed subject matter.

Each recess 32 as seen in its plan view has continuously curved shape that generally narrows rearwardly relative to the operational direction O of rotation of the dosage feeder. In particular, in the described example, the recess 32 has two lateral portions 32A and 32B whose front ends 32' are axially spaced from each other and constitute a frontmost part of the recess 32 defining its front boundary B1, and which extend at an angle to the axis X towards their common rear end 32" constituting a rearmost part of the recess 32 defining its rear boundary B2. The recess can be in the form of only one such portion as shown in FIG. 10C, or can have any other desired shape.

Each recess 32 converges inwardly so that its area adjacent the outer surface 31C of the dosage feeder is greater than that at its maximal depth.

As further shown in FIGS. 10A and 10B, the dosage feeder 31 has a dosage feeder moving member 34 integrally formed with the dosage feeder 31 and having a moving member front section 34A with its front end 34' protruding along the axis X from the front flange 31A of the dosage feeder 31, and a moving member rear section 34B with its rear end 34" protruding along the axis X from the rear flange 31B of the dosage feeder 31. When the dosage feeder is mounted in the housing, the moving member rear end 34" is freely received in the corresponding pocket 23' of the cover 23 and the moving member front section 34A freely passes through the central opening 19' of the annular wall 19 so that the moving member front end 34" protrudes from the outer surface 19B of the annular wall 19 into the interior of the ring connection portion 18 (best seen in FIG. 6), allowing thereby the dosage feeder to be rotated when the moving member front end 34' engages a driving member 48 of the closed unit 40 (the closed unit 40 with its driving member will be described in detail below with reference to FIGS. 14A and 14B). As seen in FIGS. 6 and 7, the moving member front end 34" is formed with an engagement pattern mating that of the driving member 48 ensuring that the engagement between them can take place only in their single mutual orientation.

The dosage feeder 31 and its moving member 34 can be produced as a unitary single body or they can be integrally assembled, in which case the moving member 34 can be in the form of a shaft with the dosage feeder fixedly mounted thereon.

As shown in FIG. 8D, when the dosage feeder 31 is mounted in the cavity 29 of the housing, the outer surface 31C of the dosage feeder is spaced by a distance Sr from the interior surface 21B of the housing body portion 21, this distance being equal to the difference between the diameters Dc and Df of the cavity 29 and the outer surface 31C of the dosage feeder, and each of the two opposite flanges 31A and 31B is spaced from the corresponding inner surface 18A, 23A of the annular wall 18 or the cover 23, respectively, by corresponding a distances Sa1, Sa2, which in total are equal to the difference between the lengths Lc and Lf. Optionally, the distance Sr is selected to be smaller than the minimal dimension d of the particulate material, whilst the distances Sa1 and Sa2 are greater than d.

Reverting to the removable cover 23 shown in FIGS. 9A and 9B, as already mentioned above, it has the feeder facing portion 23B with the inner surface 23A, the pocket 23' and the head portion 23C with the protrusion 23". The inner pocket 23' has such shape and dimensions as to allow the rear end 34" of the moving member to be freely rotatably received therein. The depth of the pocket should optionally be at least not smaller than the difference between the length of the rear section 34B of the moving member protruding from the rear flange 31B of the dosage feeder, and the spacing Sa2 mentioned in the previous paragraph. The cover 23 is securely mountable to the rear open end 21" of the housing body portion 21 by any suitable means subject to keeping constant the above spacing. In the described example, the feeder facing portion 23B having the inner surface 23A, is configured for being threaded into a correspondingly threaded area 29A of the cavity 29 at the rear end of the housing body portion 21.

With reference to FIGS. 7 and 12A to 12C, the open unit 20 further comprises front and rear cleaning members 35A and 35B, and a side cleaning member 26, all configured for being detachably mounted in the open unit at locations described below.

Figure 12A:
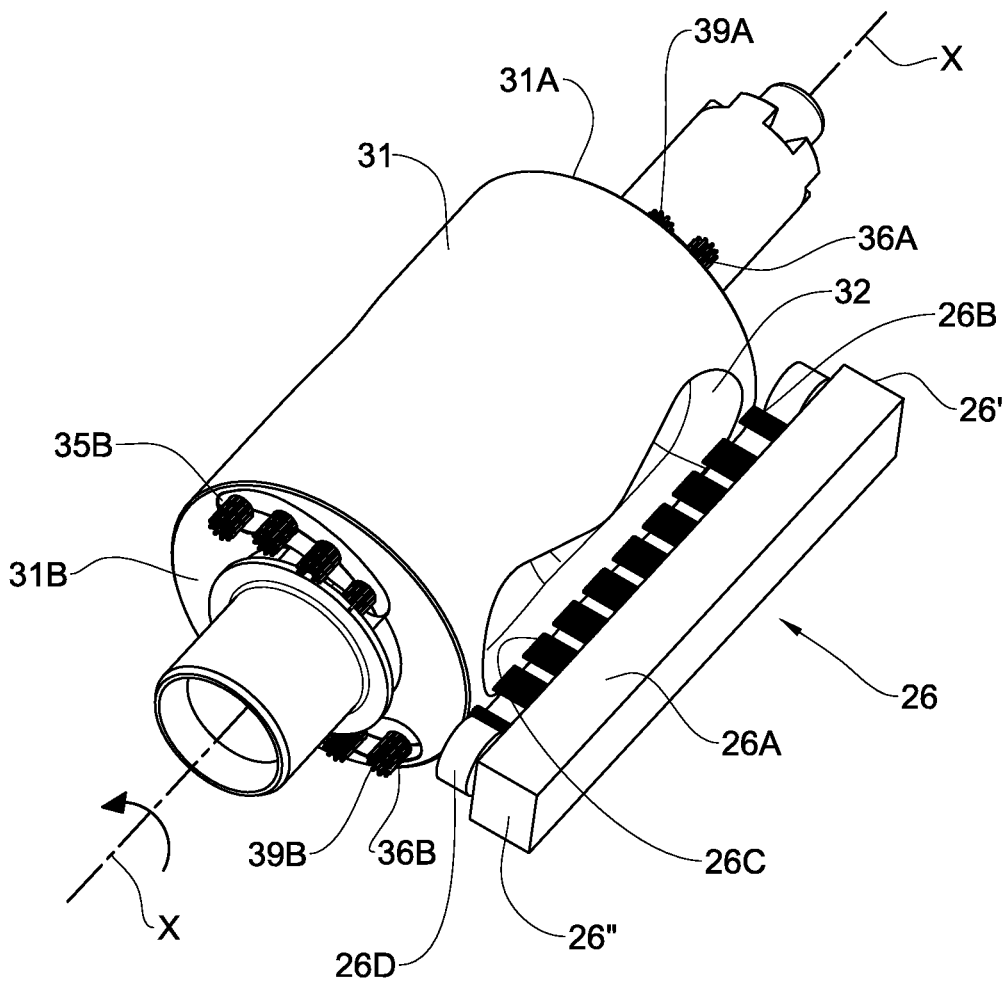
FIGS. 12A, 12B and 12C are respective schematic perspective, side and front views of the dosage feeder shown in FIG. 10 with a side cleaning unit contacting it and front and rear cleaning members mounted thereon.
Figure 12B:
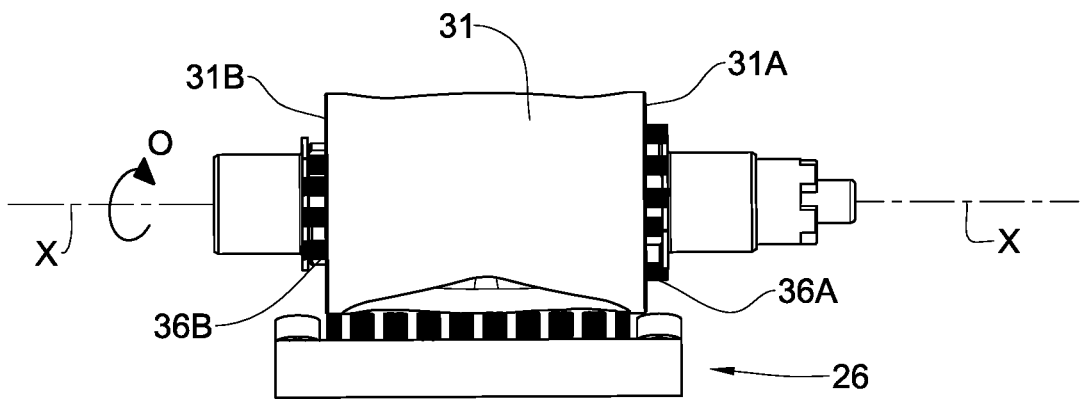
Figure 12C:
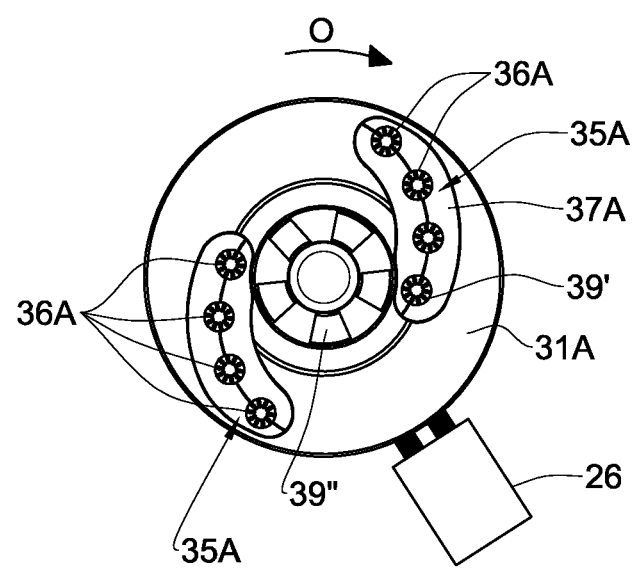

The front and rear cleaning members 35A and 35B are configured for mounting to the dosage feeder 31 at its corresponding front and rear flanges 31A and 31B so that, when the open unit 20 is assembled, their ends constituting cleaning areas will be in contact with the inner surfaces 19A of the annular wall 23A and the cover 23, respectively, whilst allowing the rotation of the dosage feeder at least in the operational direction O. As seen in FIG. 7, each cleaning member 35A, 35B has corresponding brushes 36A, 36B, which protrude from an elongated base 37A, 37B configured for being received within a correspondingly shaped flange groove 38A, 38B formed in the respective flanges 31A and 31B of the dosage feeder. The brushes 36A, 36B have ends spaced from the base 37A, 37B, which constitute front and rear cleaning areas 39A and 39B. The overall axial dimension of the cleaning members 35A and 35B and the depth of the flange grooves 37A and 38A are such that, when they are mounted within the corresponding flange grooves, the cleaning areas 39A and 39B protrude from the surface of the flanges surrounding the flange recesses to a distance at least slightly greater than the distances Sa1, Sa2. In addition, the cleaning areas 39A and 39B each extend from their radially innermost end 39' disposed adjacent the dosage feeder moving member 3 to their radially outermost end 39" disposed adjacent the outer surface 31C of the dosage feeder, when the cleaning areas are seen in their plan view. In the described example, the cleaning members have a generally curved shape and are mounted so that the radially outermost ends 39' of the cleaning areas 39A and 39B are spaced from their radially innermost ends 39" not only radially but also circumferentially in the operational direction of rotation, as best seen in FIG. 12C.

In the disclosed example, the open unit 20 comprises two front and two rear cleaning members. However, the number of front and rear cleaning members can be one of each kind or more than two, and their design can be different from that shown in the drawings. If appropriate, the apparatus can comprise the cleaning member/s only at the front or only at the rear of the open unit 20.

Moreover, in case it is desired to clean not only the dosage feeder flange surface but also one or both inner surfaces of the annular wall 19A or/and the cover 23A, one of the front and/or rear cleaning members can be mounted on the corresponding dosage feeder flange as described above and the other cleaning member can be mounted to the corresponding inner surface/s of the annular wall 19A or/and the cover 23A, and having its cleaning area in contact with the dosage feeder flange surface. Such contact will then be at a location of the dosage feeder flange, which is spaced from the cleaning member mounted thereon in the direction of the movement.

The side cleaning member 26 has a base 26A with brushes 26B protruding therefrom with their ends constituting a side cleaning area 26C so that, when the open unit 20 is assembled, they are in contact with its non-recessed zones 32' and 32" along the axial length of the dosage feeder. As best seen in FIG. 5, the side cleaning member 26 is configured for being mounted at the front portion 24' of the outlet opening 24 so that its base 26A protrudes outwardly from the exterior surface 21A of the housing body portion 21 and the side cleaning area 26C protrudes inwardly from the interior surface 21 of the housing body portion 21 to a distance at least slightly exceeding the distance Sr and extends at least along a majority of the length Lf of the dosage feeder 31.

For mounting the side cleaning member 26 at the above location of the housing body portion, the base 26A of the cleaning member and the exterior surface 21A of the body portion disposed adjacent the front portion 24' of the outlet opening are provided with mutually engaging elements. In the described example, these elements comprise fixation pins 26D protruding from lateral portions 26' and 26" of the base 26A that are free of the brushes in the same direction as the brushes, and corresponding fixation grooves 24E and 24F are formed in the exterior surface 21A of the housing body portion adjacent the front portion of 24' of the outlet opening 24 on two opposite sides thereof. The grooves and the pins have such a design that, once the pins are pushed inside those grooves, their final locking within the grooves is achieved by the closure of the removable circular cover 23.

Reverting to FIG. 7, the housing body portion 21 can further comprise two chambers (only one being seen) each covered at least in use by a chamber cover 80, which when removed allows an access to the chamber from the exterior of the housing body portion for mounting therein a heating element for heating the housing directly and the dosage feeder indirectly. Each chamber can extend only partially into the housing body portion so that its bottom is spaced from the interior surface 21B of the housing (not seen in the drawings). Alternatively or in addition, a heating member can be disposed within an axially extending chamber that can be formed in the dosage feeder.

Figure 18:
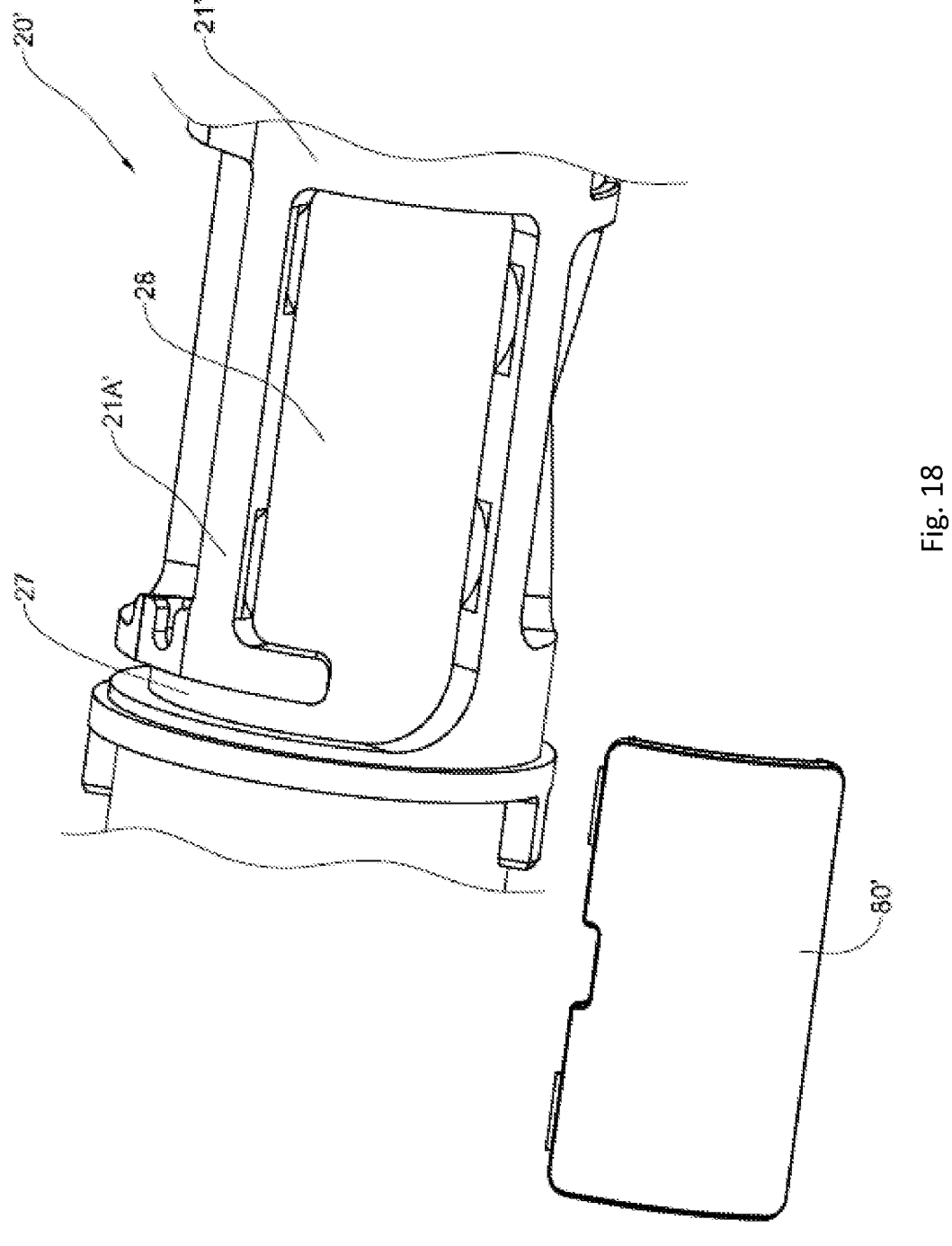
FIG. 18 is a schematic perspective view of a part of an alternative open unit, which can be used in an apparatus according to the presently disclosed subject matter instead of the open unit shown in FIG. 6.

Each chamber can allow an internal or external electrical connection of the heating element/s therein with an external power source (not shown), and the housing body portion 21 can have a corresponding design suitable for such connection. One example of such design is illustrated in FIG. 18, where a housing body portion 21' is shown with its chamber 28 being uncovered and with a guiding channel 27 extending therefrom along at least a part of an exterior surface 21A' of the housing body portion for leading the electrical connection from the chamber 28 so as not to interfere with a cover 80' when it covers the chamber.

The housing of the open unit 20 and the dosage feeder can made of a thermally conductive material, resistant to high temperature and having high strength to mechanical deformation under forces that can be exerted thereon during the operation of the apparatus. One example of such material is PET plastic.

The open unit 20 can be assembled by first mounting the front and rear cleaning members 35A, 35B to the flanges 38A, 38B of the dosage feeders, then inserting the dosage feeder into the body portion 21 of the housing from its open end 21", mounting the side member 26, inserting the heating elements in the chambers and closing the open end 21" by screwing therein the cover 23.

Figure 13:
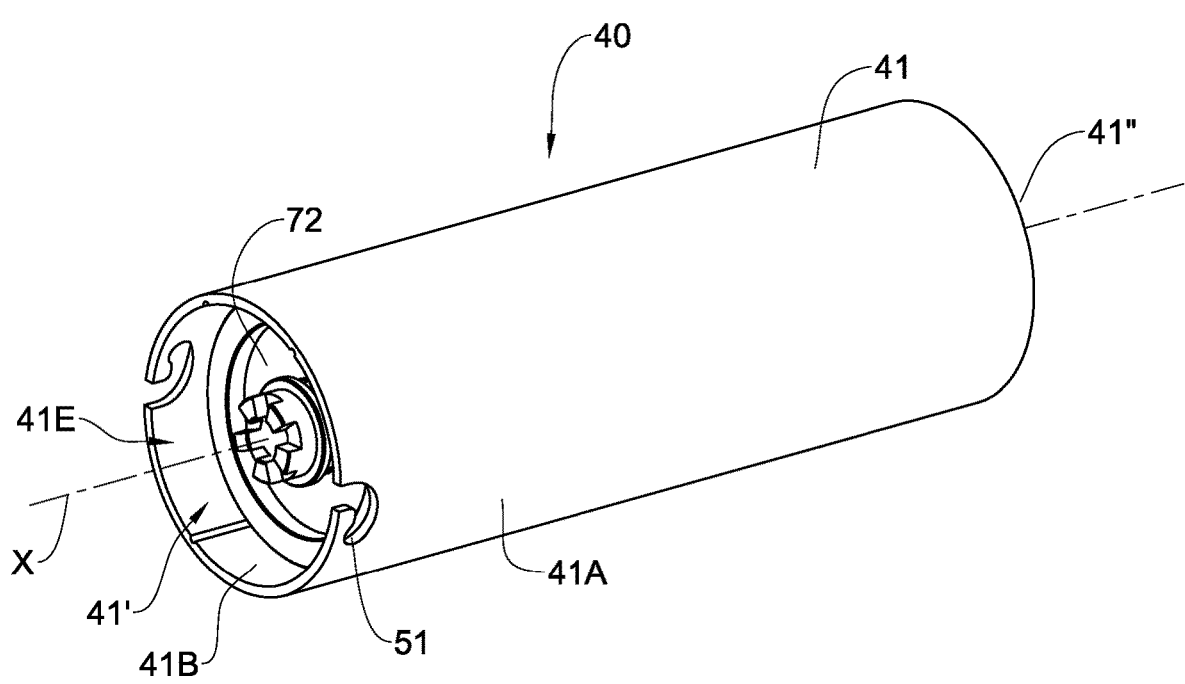
FIG. 13 is a schematic perspective view of a closed unit of the apparatus shown in FIGS. 4 and 5.
Figure 14A:
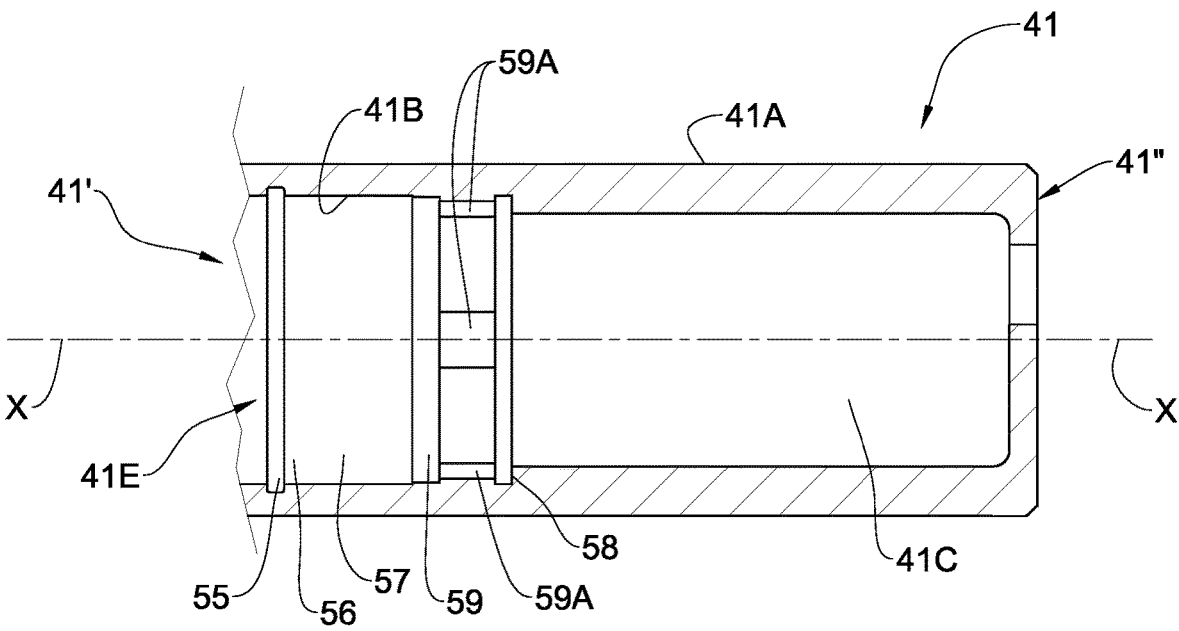
FIG. 14A is a cross-sectional view of a compartment of the housing of the closed unit shown in FIG. 13, which is configured to be sealed when the closed unit is assembled.
Figure 14B:
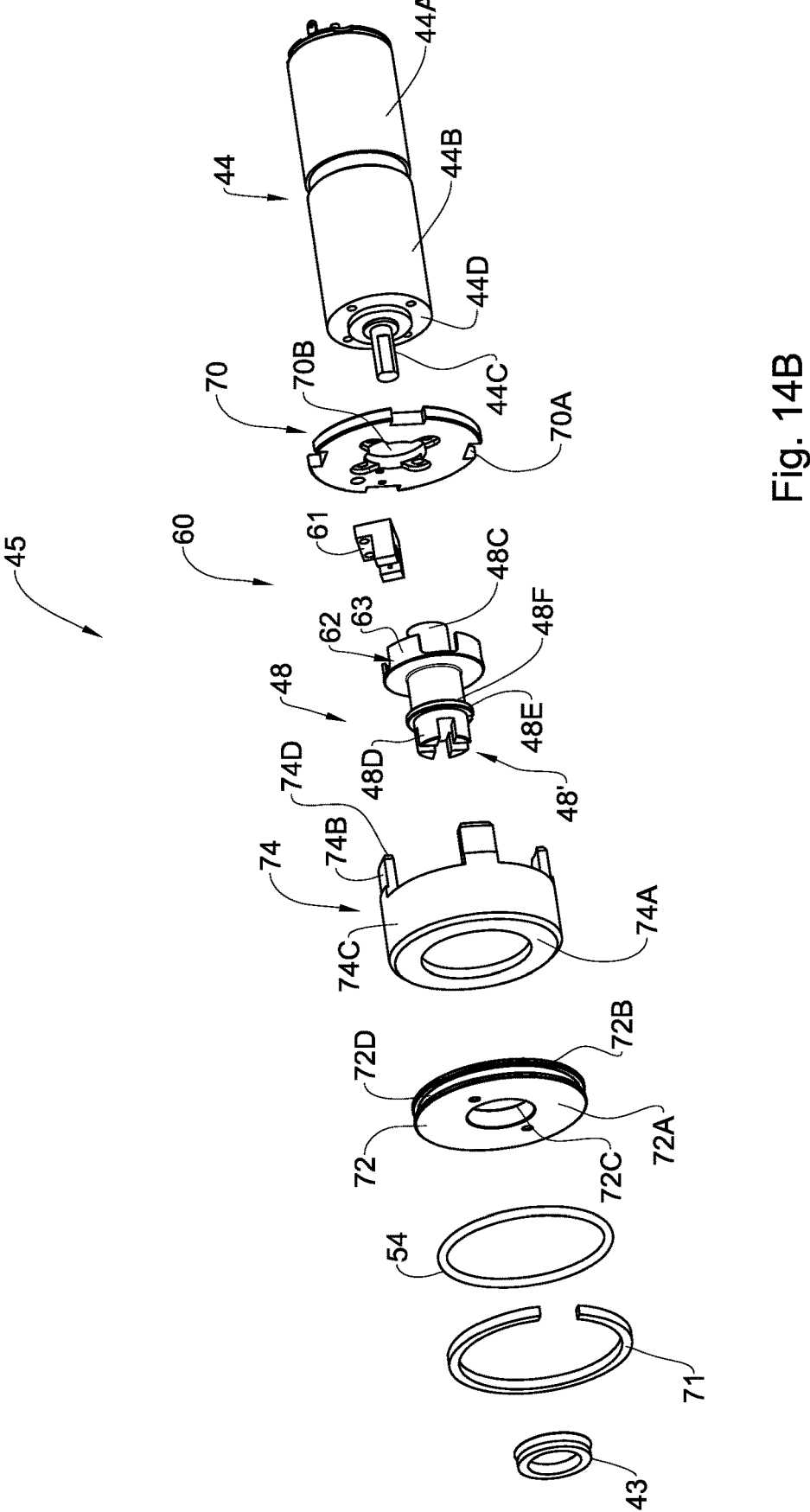
FIG. 14B is a schematic exploded view of elements configured for being disposed within and/or adjacent the compartment shown in FIG. 14A.

With reference to FIGS. 13, 14A and 14B, the closed unit 40 comprises:

a housing 41 having
        a proximal end 41' facing the open unit 20 and an opposite distal end 41" spaced from the first end along the axis X of the apparatus; in the described example the proximal end is open in the direction of the open unit 20 and the distal end is closed (FIG. 13);
        an exterior surface 41A and an interior surface 41B extending between the two ends of the housing (FIG. 14A),
        an interior compartment 41C (FIG. 14A) occupying in this example a majority of the housing interior; and
    a closed unit interior system 45 accommodated in the interior compartment 41C (FIG. 14B).

In the described example, the exterior and interior surfaces 41A and 41B of the housing are cylindrical, though this does not need to be the case as shown in an alternative example of the presently disclosed subject matter illustrated in FIG. 17.

In the described example, main components of the closed unit interior system 45 are a driving mechanism 44 associated with a driving member 48, by virtue of which the dosage feeder is to be moved, and a position indicator 60 for indirectly determining position of the recesses of the dosage feeder with respect to at least one of the inlet opening 22 and outlet opening 24 of the open unit 20. As described in detail below, when the driving mechanism, at least a part of the driving member and the position indicator are mounted in the interior compartment, this compartment is sealed to prevent them from exposure to ambient conditions.

The driving mechanism 44 of the interior system 45 comprises an electrical motor 44A with its associated transmission mechanism disposed in a casing 44B, and a shank 44C protruding from a flange 44D of the casing 44B, configured to rotate the shank.

The driving member 48 extends between its proximal end 48' configured for engagement with the front end 34' of the dosage feeder moving member 34 in a predetermined single orientation with respect to each other and to the axis X, and a distal end 48" associated with the driving mechanism, and it comprises an internal shank receiving channel open at the distal end 48" (not seen) and mating in shape and dimensions to those of the shank 44C so as to fixedly receive the shank therein, by virtue of which the driving member is rotatable by the transmission mechanism 44B.

The position indicator 60 of the interior system 45 comprises:

a position reference member 62 integrally formed or assembled coaxially with the driving member 48 and rotatable therewith, the member 62 having a peripheral reference area 63 in the form of a pattern of zones whose number and circumferential extension are correlated with those of the dosage recesses and non-recessed areas on the outer surface of the dosage feeder; and a sensor 61 mounted in fixed disposition relative to the position reference member 62 so as to sense zones in the pattern of the reference area 63 during its rotation.

The sensor 61 can be mounted directly or indirectly to any static element within the compartment 41C of the housing 41, such as e.g. the interior wall of the housing 41 or the casing 44B of the transmission mechanism. In the described example, the sensor 61 is fixedly mounted to the casing 44B by virtue of a fixation plate 70 configured for being mounted to the flange 44D of the casing 44 with the shank 44C freely passing through its central opening 70B. The fixation plate 70 is configured for holding the sensor 61 in alignment with the reference area 63.

In the described example, the closed unit 40 further comprises a separation plate 72 (FIG. 13) configured for being fixedly mounted in the housing adjacent its proximal end 41', for separating between an open portion 41E of the housing terminating at its end 41' and the interior compartment 41C. As seen in FIG. 14B, the separation plate 72 has an outer surface 72A facing towards the proximal end 41' of the housing, an inner surface 72B facing into the interior compartment 41C, a central opening 72C extending therebetween, and a peripheral edge 72D configured for receiving therein an O-ring 54.

In the described example, the housing 41 comprises a first circular fixation groove 55 (FIG. 14A) disposed in its open portion 41E, and the interior compartment 41C of the housing 41 further comprises a separation plate receiving area 56 adjacent the fixation groove 55 and a fixation unit receiving area 57 (FIG. 14A) extending between the area 56 and a stopper rib 58 formed in the interior surface 41B and comprising a second circular fixation groove 59 and axial grooves 59A extending between the circular groove 59 and the stopper rib 58, also formed in the interior surface 41B.

Referring to FIGS. 14A and 14B, the above geometry of the housing is used as follows:

the first fixation groove 55 receives therein a fixation ring 71;

the second fixation groove 59 receives therein the fixation plate 70, which has grooves 70A;

the separation plate 72 occupies the area 56 with its O-ring abutting the interior surface 41B along that area and its outer surface 72A contacts along its circumference the fixation ring 71, and the fixation unit receiving area 57 receives therein a fixation cup 74 having a cup bottom 74A, a cup body 74C and prongs 74B extending distally therefrom via the grooves 70A of the fixation plate 70 and the axial grooves 59A in the interior surface 41B, to have their ends 74D abut the stopper rib 58.

Thus, when assembled as above, the separation plate 72 appears to be fixedly held in place between the fixation ring 71 received within the groove 55 and the cup bottom 74A biased towards the inner surface 72B of the separation plate as a result of abutment of the prongs 74B against the stopper rib 58. The O-ring 54 of the separation plate 72 thus seals the interior compartment 41C along the edge 72D of the plate.

Referring to FIG. 14B, the cup body 74C has a diameter large enough to allow the position indicator 60 to be disposed therein with the possibility of rotation together with the driving member 48. Thus, when the interior system 45 is assembled, a distal portion 48C of the driving member 48 with the position reference member 62 and the sensor 61 are disposed within the cup body 74C, whilst a proximal portion 48D of the driving member 48 passes via the central opening 72C of the separation plate 72 and protrudes outwardly therefrom to allow the proximal end 48' of the driving member 48 to engage the front end 34' of the dosage feeder moving member 34.

The proximal portion 48D of the driving member 48 has, at its area protruding from the separation plate 72, a V-ring carrying section 48E with an annular projection 48F. The section 48E is configured for carrying thereon a V-ring 43 for rotatingly sealing the interior compartment 41C along the central opening 72C of the separation plate 72, so that when the interior system 45 is assembled, the V-ring 43 appears to be pressed between the projection 48F and the outer surface 72A of the separation plate as shown in FIG. 13, sealingly rotating together with the driving member 48.

Regarding the engagement of the distal end 48" of the driving member 48 with the front end 34" of the dosage feeder moving member 34, this is provided by specific mating engagement patterns of the two ends, which as mentioned above ensure that the coupling between them can take place only in their single mutual orientation. In the described example, the engaging patterns on the distal end 48' of the driving member 48 and the front end 34" of the dosage feeder moving member 34 are in the form of asymmetrical complementary protrusions and recesses, though they can have any other appropriate design.

In the described example, the position reference member 62 has a cup-like shape with the reference area 63 being in the form of protrusions 63A axially extending from its periphery and circumferentially spaced from each other by open spaces 63B. The number of protrusions can be the same as that of the dosage recesses and the non-recessed areas, in which case the above described coupling between the distal end 48" of the driving member 48 with the front end 34" of the dosage feeder moving member 34 ensures that the open spaces 63B between the protrusions 63A are fully aligned with the respective dosage recesses 32 on the dosage feeder 31. In the described example, the number of protrusions and open spaces in the reference area 63 is twice that of the respective number of dosage recesses and non-recessed areas, in which case each dosage recess and each non-recessed area of the dosage feeder is aligned with a protrusion-open space couple of the reference area 63, whereby the response speed of the position indicator is increased.

Figure 15:
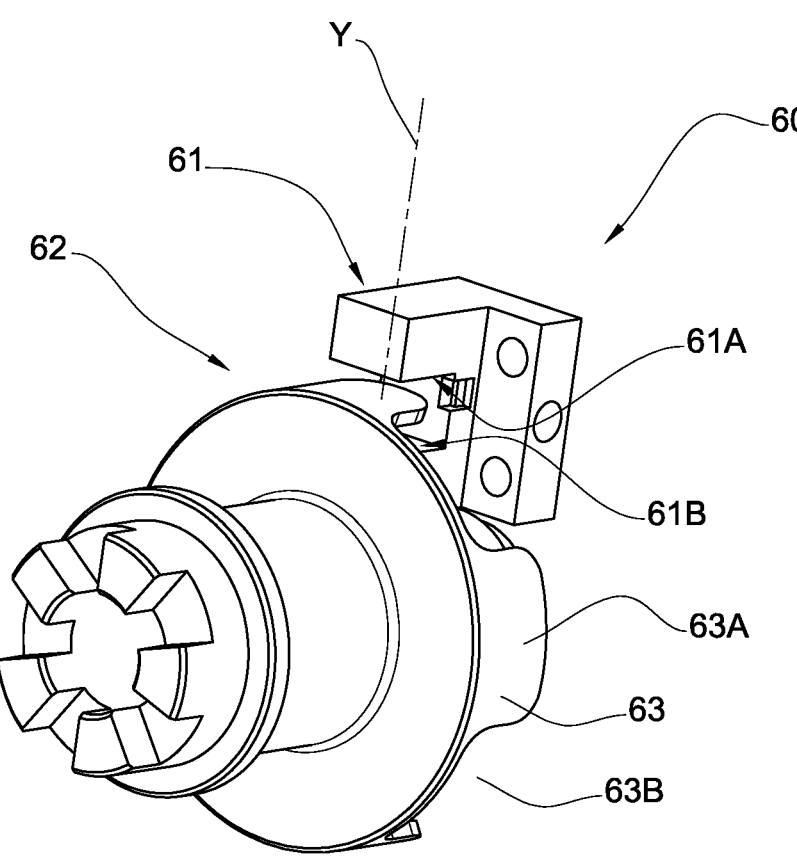
FIG. 15 is a schematic perspective view of a position indicator constituting a part of the closed unit interior system shown in FIG. 14.

In the described example, the sensor 61 is in the form of an optical position sensor comprising an optical axis Y with a light source 61A and a light receptor 61B spaced therealong, and fixedly mounted relative to the position reference member 62 so that, during rotation of the position reference member 62, each of its protrusion 62A passes between the light source 61A and the light receptor 61 and crosses the optical axis Y. Consequently, a light beam directed along the optical axis from the light source 61A to the light receptor 61B is interrupted each time when one of the protrusions 62A of the position reference member 62 passes between the light source 61A and the light receptor 61B. With the protrusions 63A extending axially as shown in FIGS. 14B and 15, the optical sensor is mounted so that its optical axis Y is oriented radially. In an alternative embodiment shown in FIG. 16 protrusions 63' are oriented radially and an optical sensor 61' is mounted so that its optical axis is oriented axially. The sensor 61 does not have to be an optical sensor but rather can be in the form of any kind of a position sensor.

The closed unit interior system 45 is configured to be connected to an external power supply source (not shown) for providing power needed for functioning of the driving mechanism 44, the position indicator 60. In addition, the position indicator 60 and the transmission mechanism 44B are configured for being connected to a control system, which can be the controller 8 (shown in FIGS. 1 and 2), for controlling/monitoring their operation and for receiving from the position indicator 60 signals indicative of the position of the dosage recesses on the dosage feeder. The above connections can be provided via corresponding connectors (not shown) that can sealingly pass through any wall of the housing 41, e.g. through its closed end 41'.

The closed unit 40 is assembled by assembling its interior system 45 and mounting it in the housing 41, as described above, with the protruding driving member distal end 48' for its further connection to the front end 34'' of the dosage feeder moving member 34, thereby connecting the dosage feeder to the closed unit 40.

Reverting to FIG. 13, the open portion 41E of the housing 41 is formed at the open end 41' with fixation slots 51 configured to receive therein fixation pins 25 formed on the connection ring portion 18 of the housing of the open unit 20 (seen in FIGS. 6, 7, 8A, 8B). In the described example, the fixation slots extend along a curved trajectory in the operational direction of rotation of the dosage feeder so as to ensure that when the fixation pins are inserted therein and the housing of the open unit 20 is turned in that above direction relative to that of the closed unit 40, the fixation pins are moved along the fixation slots until they are firmly locked into the fixation slots, thereby integrally connecting the open and closed units. The turning of the housing of the open unit 20 relative to the closed unit 40 in the operational direction of the dosage feeder 31 is used to prevent the possibility of dissembling of the open and closed units in case the dosage feeder is suddenly stuck for some reason, i.e. its rotation is unexpectedly stopped. The curved shape of the fixation slots can be a C-like or a hook-like shape as shown.

However, the manner of connection of the open and closed units 20 and 40 to each other does not necessarily need to be as described above, rather any other suitable means can be used for such connection. Moreover, the housings of the open and closed units do not need to be connected directly, as described above, rather they can be spaced from each other, in which case coupling of the dosage feeder moving member of the open unit with the driving member of the closed unit can take place outside and between the open and closed units, as in an apparatus 100 shown in FIG. 17, according to an alternative embodiment of the presently disclosed subject matter.

In operation of the apparatus 10 controlled by the controller 8, the dosage feeder is rotated in the cavity 29 of the open unit 20 in the operation direction of rotation and a dosage of the particulate material is formed in each dosage recess when it is in its uppermost position and passes by the inlet opening 22. During this movement of the recess it is continuously filled with the particulate material, and is then moved during the rotation of the dosage feeder towards the outlet 24 and the material drops out of the dosage recess under the influence of gravity.

During the filling of the dosage recess, the front portion 22' of the inlet opening 22 which continuously raises away from the space between the interior surface 21B of the housing 21 and the outer surface of the dosage feeder 31 assists in moving the material which has not entered the recess away from that space till during the rotational movement of the dosage feeder, the recess is moved away from the inlet opening 22.

During rotation of the dosage feeder, its cleaning members clean the surfaces of the dosage feeder and cavity contacted by their cleaning areas from debris and particles which then free fall through the outlet opening. The heating elements heat the open unit 20, minimizing or preventing condensation on surfaces within the open unit and in the bottom part of the container under, which it is mounted as shown in FIGS. 1 and 2.

The position indicator 60 produces signals, which are then used by the controller to count the total number of times when dosage recesses have passed by the outlet opening and thereby to determine a precise number of dosages of the material disposed through the outlet opening, by virtue of which a precise concentration of the material in a resulting liquid solution can be established. In addition, the above signals can be used by the controller to calculate total amount of material received by the dosage feeder at any time and, consequently, to calculate the amount of material left in the container 2 (FIGS. 1 and 2) of the system, which otherwise would need to be provided with sensors for sensing the level of material inside it.

The controller further controls the operation of the apparatus to perform one or more of the following:

to stop rotation of the dosage feeder in a position when it is fully covered by one of the non-recessed zones, so that each dosage recess is spaced to a maximal extent from the outlet opening, due to which its exposure to moisture is essentially reduced;

to control and monitor the rate of the rotation of the dosage feeder in order to identify its reduction that can take place as a result of some eventual obstruction to such movement such as, e.g. a concentration of solid particles and debris, greater than diameter d, in the space between the inner surfaces of the cavity, and the outer surfaces of the dosage feeder;

to reverse the operational rotational direction of the apparatus to its non-operational direction, if and when desired.

Reversing the direction of rotation can be performed in order to remove the above obstruction or in order to improve the effectiveness of the cleaning units and extend the time required to eventually replace the integral unit for maintenance due to extreme accumulation of debris and solid particles in the space between the cavity and the dosage feeder of the open unit.

The controller can also be used to monitor, make necessary calculations and control the entire system comprising monitoring all sensors connected to the system such as: sensors indicating minimum and maximum volumes for the liquid chemical material, sensor for indication of concentration of particulate material in the chemical solution, sensors for indication of input power levels (amperes, voltage), sensors for indication of ambient and chemical solution temperatures, etc.

Figure 17A:
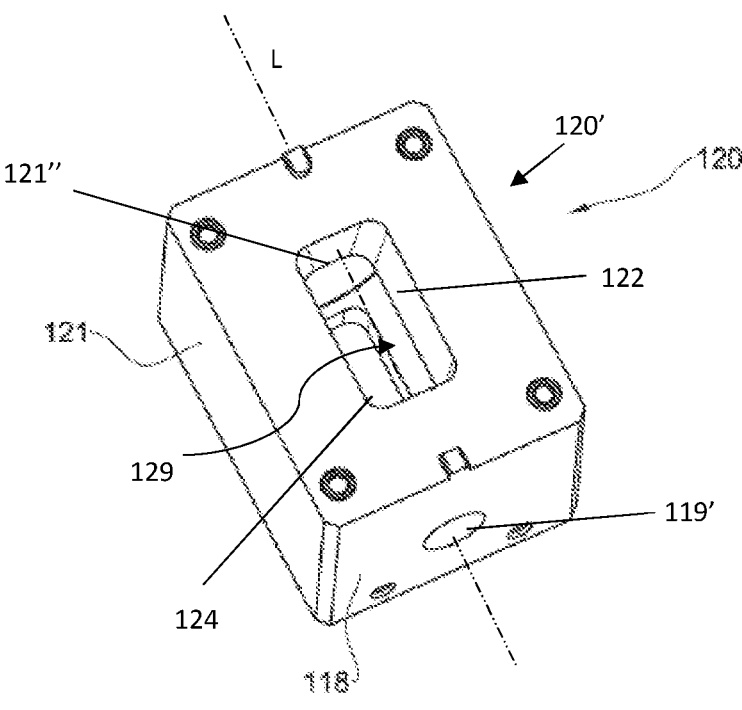
FIG. 17A is a cross-sectional view of one example of a housing of an open unit of the apparatus shown in FIG. 17.
Figure 17B:
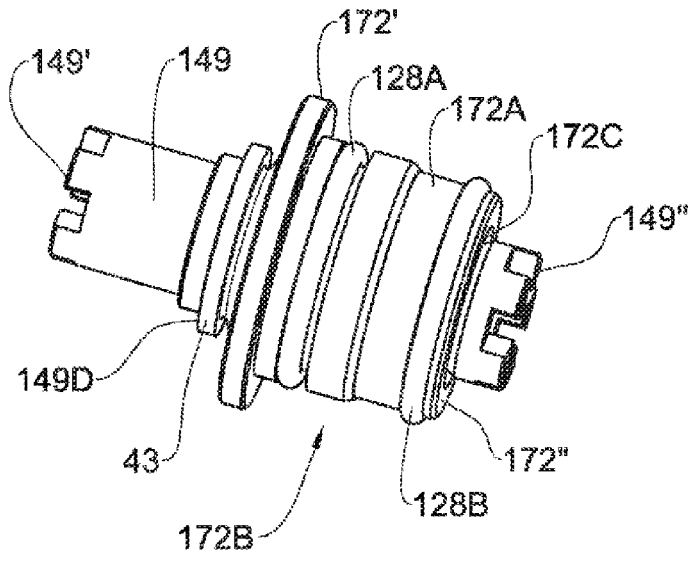
FIG. 17B is a perspective view of a number of specific elements of the apparatus shown in FIG. 17, in their spaced mutual disposition.

FIGS. 17, 17A and 17B illustrate an apparatus 100 according to another embodiment of the currently disclosed subject matter, which differs from the above described apparatus 10 mainly in the constructional features described below.

Housings 121 and 141 of respective open and the closed units 120 and 140 of the apparatus 100 each have a generally box-like shape with its exterior surfaces being all planar. In particular, the housing 121 (FIG. 17A) has planar top and bottom surfaces (with respective inlet and outlet openings similar to those of the housing 21 of the open unit 20). The housing 141 also has a planar top, which is open and via which an interior system of the closed unit 140 can be inserted into its interior.

The open and closed units 120 and 140 are shown in FIG. 17 as integrally assembled together by means of a common top plate 110 detachably attached thereto. The housings 121 and 141 thus do not have connection portions like connection rings of the housings 21 and 41.

Walls 118 and 172 of the housings 121 and 141, which function similarly to the respective annular wall 18 and separation plate 72 of the open and closed units 20 and 40 and which face each other when the apparatus is assembled, are provided with spacing elements 119 and 143 protruding from one of the walls and abutting the other wall, to facilitate stability of the apparatus when the units 120 and 140 are assembled together by the attachment of the cover plate 110 thereto.

Figure 16:
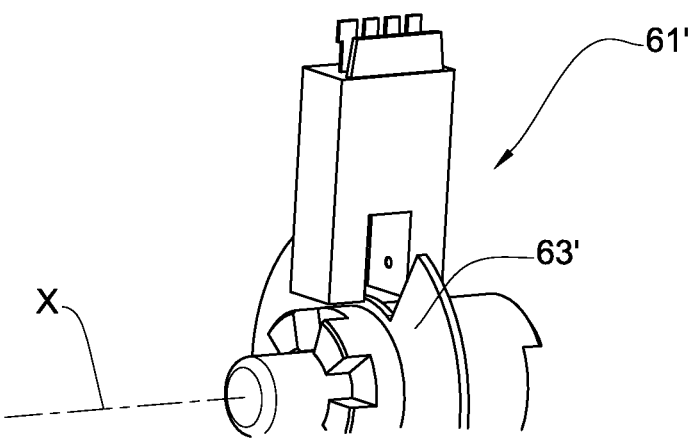
FIG. 16 is a schematic perspective view of a position indicator that can be used in an apparatus according to another embodiment of the presently disclosed subject matter.

With reference to FIG. 17B, a driving member of the interior system of the closed unit 140 comprises a driving member extension element 149 with an annular projection 149D. The extension element 149 thus constitutes a proximal portion of the driving member, a part of which designated as 148 in FIG. 17, protrudes from the housing 141 and another part is disposed within the housing 141 together with a driving member distal portion having a design similar to that of the driving member 48 (not seen). The driving member extension element 149 has proximal and distal ends 149' and 149" with engagement patterns mating those of the driving member distal portion (which is seen in FIGS. 15 and 16) and of the front end 34" of the dosage feeder moving member (seen in FIGS. 10A-10C) so as to ensure that their coupling can take place only in their single mutual orientation. The engagement of the distal end 149" of the driving member extension element with the front end 34" of the dosage feeder moving member 34, takes place in a space 170 outside and between the open and closed units 120 and 140.

The housing 141 has a sealed interior similar to that of the housing 41 of the closed unit 40, when the apparatus 120 is assembled, the sealing being provided at the wall 172 and at the open top of the housing by means of the following elements:

a sealing strip (not seen) mounted at the circumference of the open top of the housing 141 and contacting the top plate 110 when mounted to the open top and to the top surface of the open and closed units 120 and 140, respectively; and two O-rings 128A and 128B carried by a transition sleeve 172A mounted within an opening of the wall 172 as described in more detail below; and a V-ring mounted on the driving member extension element 149 adjacent its annular projection 149.

FIG. 17B shows the transition sleeve 172 and the driving member extension element 149 in their mutual disposition when the closed unit 140 is assembled. As seen, the transition sleeve 172A has two disk-shaped ends 172' and 172" of different diameters, a sleeve body 172B with a through passage 172C extending therebetween, and is configured so that, when the closed unit 140 is assembled and transition sleeve is mounted in the opening of the wall 172 of the housing 140:

the disk-like end 172' of a larger diameter contacts an outer surface of the wall 172 around the opening (FIG. 17), a majority of the sleeve body 172B with the O-ring 128A mounted therein is disposed within the wall 172, the disk-like end 172" of a smaller diameter with the associated O-ring 128B protrudes from an inner surface of the wall 172 so that the O-ring 128B is tightly held between this surface and the disk-like end 172".

The driving member extension element 149 passes through the passage 172C of the transition element 149 so that its V-ring 43 is tightly held between the annular projection 149D of the element 149 and disk-like end 172' (FIG. 17).

As clear from the above description, the open unit housing of an apparatus of the presently disclosed subject matter allows easy mounting and removal of the dosage feeder thereto/from for whatever purposes this might be needed, since it comprises a housing body portion that has a rear opening configured to allow mounting the dosage feeder into the cavity of the open unit and removal therefrom, and a front opening via which the dosage feeder can be connected to the driving member. The housing body portion has a housing rear end on which the rear opening is formed, a housing front end on which the front opening is formed, and an interior surface defining the cavity of the open unit housing. The housing rear end can have an inner surface that constitutes a portion of the interior surface defining the cavity.

Consequently, the open unit described above allows easy replacement of the dosage feeder if needed and even can be interchangeably used with different dosage feeders. The open unit housing can thus comprise detachably attachable pieces that can be used to modify the housing body portion to suit different dosage feeders. For example, if the different dosage feeders require different sizes of the inlet opening of the open unit housing, the housing can comprise a removable inlet restricting piece mountable to the open unit housing so as to cover a portion of the inlet opening. Another example is when one of dosage feeder is to be used with a cleaning member mountable in a corresponding slot in the open unit housing, whilst another dosage feeders does not require this cleaning member, in which case a cleaning member placeholder piece can be used, which is removably mountable in the slot when a dosage feeder of the latter type replaces the dosage feeder of the former type.

The different dosage feeders can be of the types that require altitudinal spacing between the inlet and outlet opening of the cavity and longitudinal spacing between the inlet and outlet of the cavity. Such different dosage feeders can be, for example, a first dosage feeder of the kind described above and a second dosage feeder in the form of a screw feeder. In the latter case, at least a lower outlet plug can be used which is detachably mountable to the lower portion of the housing body portion to close/plug the lower outlet opening of the housing body portion. The lower outlet opening can interchangeably be referred to herein as a bottom opening of the lower portion of the housing body potion. The lower outlet plug can have an upward facing surface that can constitute a portion of the housing body portion inner surface that binds the cavity when the lower outlet plug is mounted to the lower portion of the housing body portion.

Reverting to FIG. 17A and also referring to FIG. 19, it will now be described how the open unit can be used not only with the dosage feeder 31 described above but also with a screw feeder 310 shown in FIG. 20.

Whilst the structure of the screw feeder and the manner of its operation will be described in detail below, it should be indicated already now that the screw feeder has a moving member with front and rear ends and is mountable in the cavity of the housing body portion of the open unit housing. The moving member front and rear ends of the screw feeder can be the same as those of the dosage feeder 31 described above. The screw feeder illustrated in FIG. 20 comprises a moving member front end, designated as 134', and a moving member rear end, designated as 134".

As shown in FIG. 17A, the housing 120' of the open unit 120 comprises a housing body portion 121 that has an inner surface defining a cavity 129 having an altitudinal axis A (not shown) and a longitudinal axis L, an inlet opening 122 formed at the upper portion of the housing 121, a lower outlet opening 124 (bottom opening) formed at its lower portion and spaced apart from the inlet opening 122 along the altitudinal axis A, and a rear end opening 121" constituted by a rear open end of the housing 121 and spaced apart along the longitudinal axis from the inlet opening 122.

The inlet opening 122 of the housing body portion 121 constitutes the inlet of the cavity 129 when the dosage feeder 31 described above is used and at least participates in providing such inlet when the screw feeder 310 to be described below is used. The lower outlet opening 124 constitutes a lower outlet 124 of the cavity 129, when the dosage feeder 31 described above is used. The rear end opening 121" of the housing body portion 121 participates in providing a rear outlet opening to the cavity 129 when the screw feeder 310 described below is to be used therein.

The open unit housing 120' further comprises a first removable cover 123' (seen in FIG. 17) that can be securely mounted to the rear end opening 121" to cover it when the dosage feeder described above is in use. The first removable cover 123' has a pocket configured to freely receive the moving member rear end 34" of the first dosage feeder 31.

The housing 120' of the open unit 120 further comprises a second removable cover 223" that can be securely mounted to the rear end opening 121" when the screw feeder 310 is to be used, and has a pocket 23" configured to freely receive the moving member rear end 134" of the screw feeder 310. A front opening 119' is formed at the front portion of the housing 121 to allow the moving member front end 134' of any dosage feeder 31, 310 to pass therethrough and engage with the driving member 48 of the closed unit 140. Upon assembly, any dosage feeder can be inserted into the cavity through the rear end opening 121".

Figure 19:
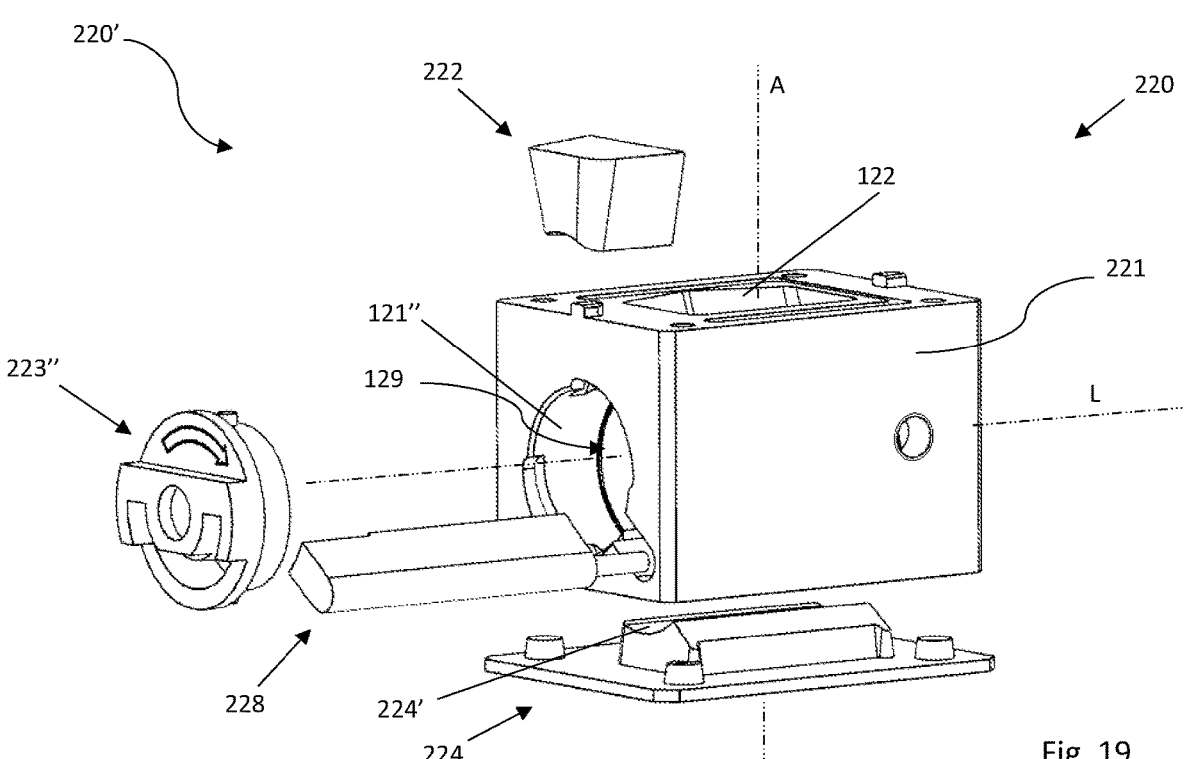
FIG. 19 is an exploded view of a further example of an open unit housing which can be used in an apparatus according to the presently disclosed subject matter.

FIG. 19 illustrates an exploded view of an exemplary open unit housing 220' having a housing body portion 221 and comprising all the features of the open unit housing 120' described with reference to FIG. 17A, as well as a second removable cover 223" and a lower outlet plug 224. The lower outlet plug 224 is mountable to the lower portion of the housing body portion 221 of the open unit housing 220' to block the lower outlet opening 124 of the cavity. The lower outlet plug 224 has an upward facing surface 224' that constitutes a portion of the inner surface that binds the cavity, when the lower outlet plug 224 is mounted to the housing body portion 221.

A screw feeder that can be removably mountable in the above open unit housing comprises a longitudinal axis, and can be configured to move dosages from the inlet opening of the cavity along the longitudinal axis through the cavity and towards the outlet opening of the cavity. The screw feeder can comprise a shaft having a front and a rear end and a shaft outer surface. A continuous spiral flight can extend along at least a portion of the shaft and have a front and a rear end portion adjacent the front and rear end of the shaft, respectively. The screw feeder can be mountable in the open unit housing so that the front end portion of the flight is associated with the inlet opening of the cavity, and the rear end portion of the flight is associated with the outlet opening of the cavity. The continuous spiral flight can comprise at least one flight portion that corresponds to a full turn of the spiral flight along the shaft. Together, the at least one flight portion and shaft outer surface extending therealong can constitute at least one dosage-forming surface of the screw feeder.

The front end of the shaft can be connected to or can constitute the front end of a moving member thereof, henceforth referred to as the front moving member, similar to the front moving member of the dosage feeder described above with reference to FIGS. 10A-10C. Thus, the front moving member can be formed as a unitary body with the screw feeder. As discussed with reference to FIG. 14B, the front moving member can be configured to detachably engage with the driving member of the closed unit such that the engagement can occur in a predetermined single orientation with respect to the driving member and the longitudinal axis of the screw feeder. The rear end of the shaft can constitute the moving member rear end of the screw feeder.

Figure 20:
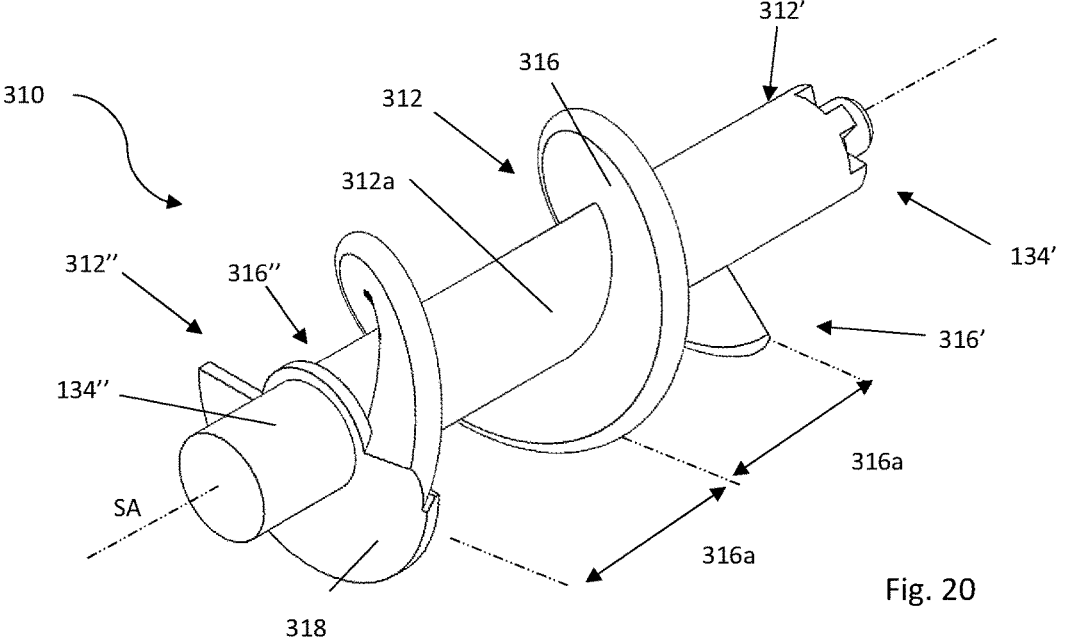
FIG. 20 is a perspective view of an example of a screw feeder, which can be used in an open unit of an apparatus according to the presently disclosed subject matter.

FIG. 20 illustrates a front perspective view of a screw feeder of the kind described above. The screw feeder is designated as 310, and it has a longitudinal axis SA and a shaft 312 having a front and a rear end 312', 312" and a shaft outer surface 312a. A pattern of grooves and protrusions formed at the front end of the shaft constitute the moving member front end 134' of the screw feeder 310. The rear end 312" of the shaft 312 constitutes the moving member rear end 314" of the screw feeder 310. A continuous spiral flight 316 extends along the outer surface of the shaft between a front and a rear end portion 316', 316", which are adjacent to the front and rear end of the shaft 312', 312", respectively. The continuous spiral flight 316 comprises two flight portions 316a. Together, the two flight portions 316a and the shaft outer 312a surface therebetween constitute dosage-forming surfaces of the screw feeder.

The second removable cover of the open unit housing can be mounted to the rear opening of the housing via any appropriate connection, when the screw feeder is to be used. For example, the second removable cover can have pins that can be pushed inside corresponding grooves of the open housing unit to lock thereto. As described above, similarly to the first removable cover, the second removable cover can have a pocket configured to freely receive the moving member rear end of the screw feeder. However, the second removable cover can be configured to only partially seal/plug the rear end opening of the open unit housing and to have a cover opening that constitutes a rear outlet for the cavity. The cover opening can be located at a bottom portion of the cover. Optionally, the cover opening can have an inclined orientation relative to the longitudinal axis of the open unit housing to allow any material entering it to fall under the influence of gravity. More particularly, the cover opening can have inner and outer edges thereof, the outer edge being located lower than the inner edge so that the lowermost point of outer edge is further from the longitudinal axis than a lowermost point of the inner edge. The cover can have a dosage feeder facing surface, herein referred to as a cover inner surface, that at least partially constitutes the inner surface of the housing rear end.

Figure 21A:
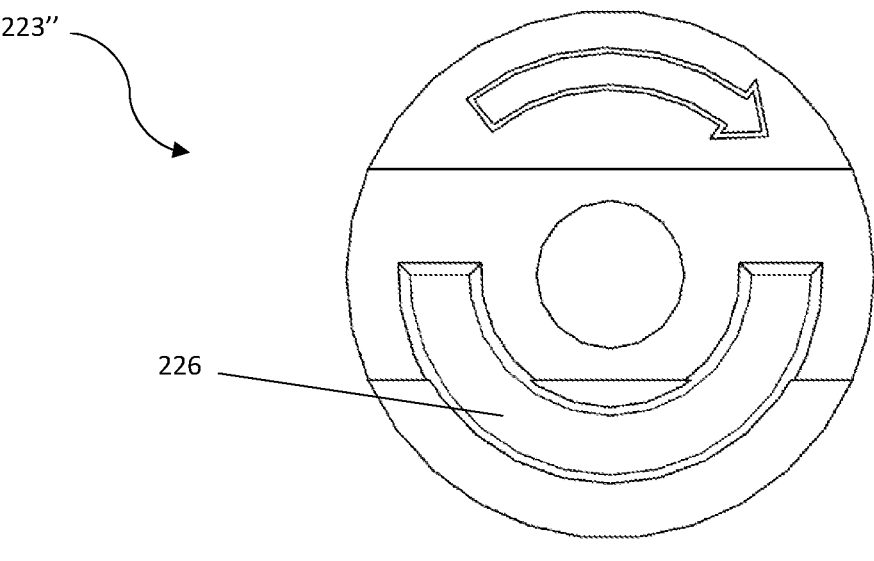
FIG. 21A is a front view of an example of a second removable cover that can be used with the housing shown in FIG. 19.
Figure 21B:
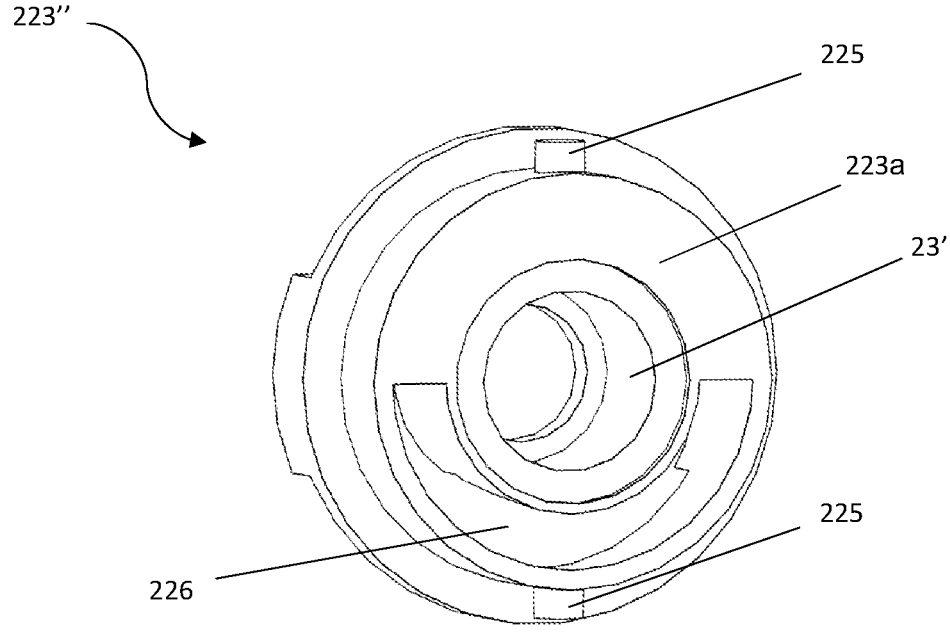
FIG. 21B is a perspective view of the second removable cover that is shown in FIG. 21B.

As seen in FIGS. 21A and 21B illustrating a front and a back perspective view of the second removable cover 223", respectively, in the present example the removable cover has two pins 225 that can be pushed inside corresponding grooves (125 in FIG. 24A) of the housing body portion 221 to lock thereto. The second removable cover 223" comprises a cover inner surface 223a, and a pocket 23' configured to freely receive a rear portion 134" of the screw feeder 310. An outlet opening 226 is formed at the bottom portion of the second removable cover 223". The outlet opening 226 constitutes the rear outlet opening of the cavity 129 when the second removable cover 223" and the screw feeder 310 are in use. The rear outlet opening can constitute the outlet opening of the cavity when the screw feeder is to be used. Thus, upon rotation, the screw feeder 310 can move dosages of material along the bottom surface of the cavity towards the rear outlet opening of the cavity.

To allow preventing exposure of the dosage forming surface/s of a screw feeder to the exterior of an apparatus according to the presently disclosed subject matter, when the rotation of the screw feeder needs to be stopped for whatever purpose, the screw feeder can have an outlet closing surface which can take a plurality of positions when the screw feeder is rotated, including a closed position in which the outlet closing surface is aligned with the outlet opening. The outlet-closing surface can at least partially bound the at least one dosage-forming surface of the screw feeder. Thus, the operation of the apparatus can be controlled so that, when the dosage feeder is to be stopped, this can be done at the moment when the outlet closing surface is in the closed position. When the outlet-closing surface is in a position other than the closed position, it is considered to be in an open position. The outlet-closing surface of the screw feeder can be in the form of a plate located at the rear end portion of the continuous spiral flight. The shaft, the continuous spiral flight and the plate can be formed as a unitary body. The rear outlet opening can have an arcuate shape, and the plate can be semicircular, concentric with the shaft and can have the same diameter as the continuous spiral flight.

Figure 22A:
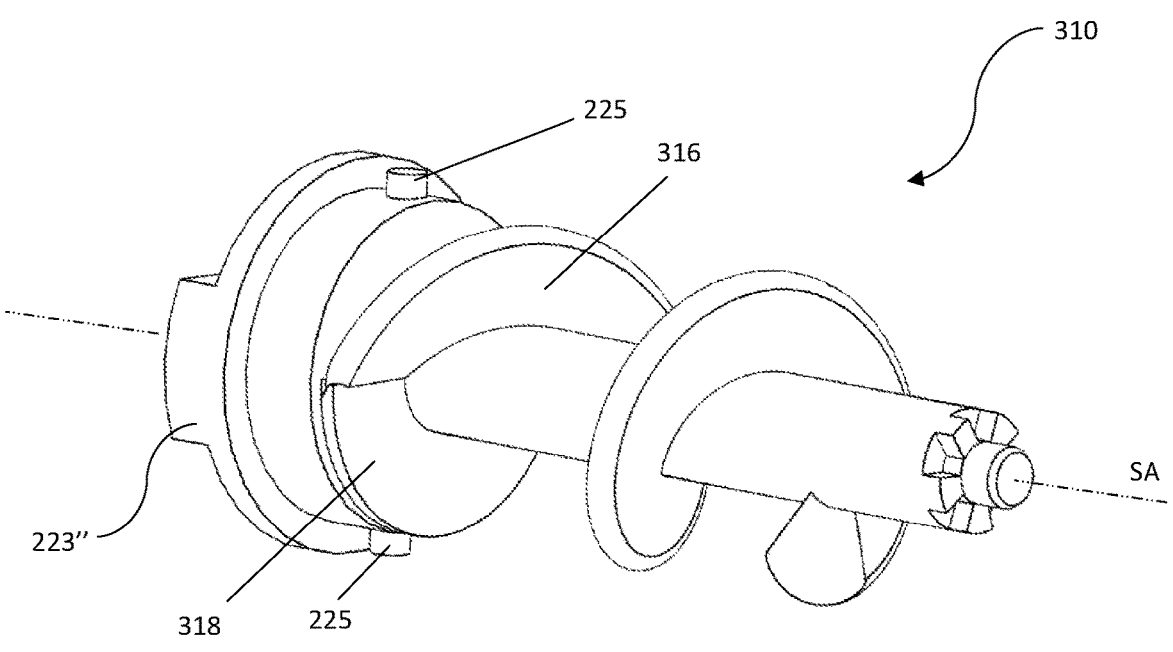
FIG. 22A is a perspective view of the screw feeder shown in FIG. 20 and the second removable cover shown in FIG. 21A when an outlet closing surface of the screw feeder is in the closed position.
Figure 22B:
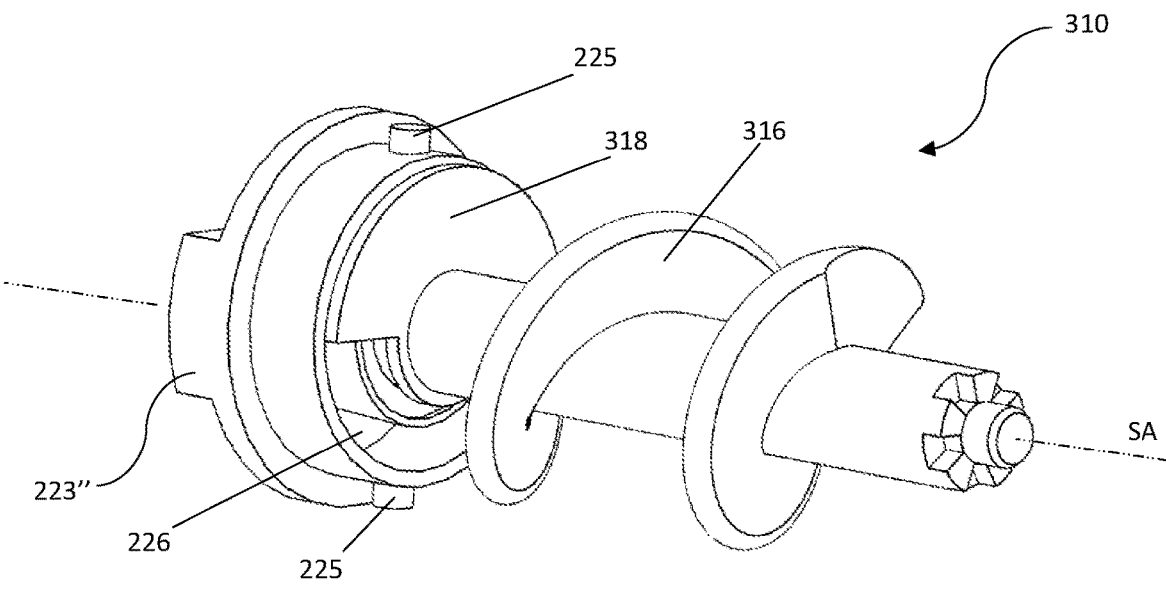
FIG. 22B is a perspective view of the screw feeder and the second removable cover shown in FIG. 22A when the outlet closing surface of the screw feeder is in the open position.

In the example of the screw feeder illustrated in FIG. 20, its outlet closing surface is constituted by a plate designated as 318. The plate 318 is semicircular and concentric with the shaft 312 and has the same diameter as the continuous spiral flight 316. The shaft 312, the continuous spiral flight 316 and the plate 318 are formed as a unitary body. FIGS. 22A and 22B illustrate back perspective views of the screw feeder illustrated in FIG. 20 and the second cover 223", when the plate 318 is in the closed and open position, respectively.

As mentioned above, dosage feeders such as a screw feeder may require an inlet opening of a size different from that needed for other dosage feeders. For example, an inlet opening required for a screw feeder can be shorter along the longitudinal axis thereof than the inlet opening optimal for dosage feeders such as the dosage feeder 31 described above, that requires altitudinal spacing between the inlet and outlet of the cavity. Thus, as also mentioned above, the open unit housing can further comprise a removable inlet restricting piece that is mountable in the inlet opening of the housing body portion to restrict the size of the cavity inlet opening. The inlet restricting piece can extend within the inlet to restrict the inlet opening of the cavity to a predetermined length along the longitudinal axis, for example, to the same length or a length lesser than that of a single flight portion.

Figure 23:
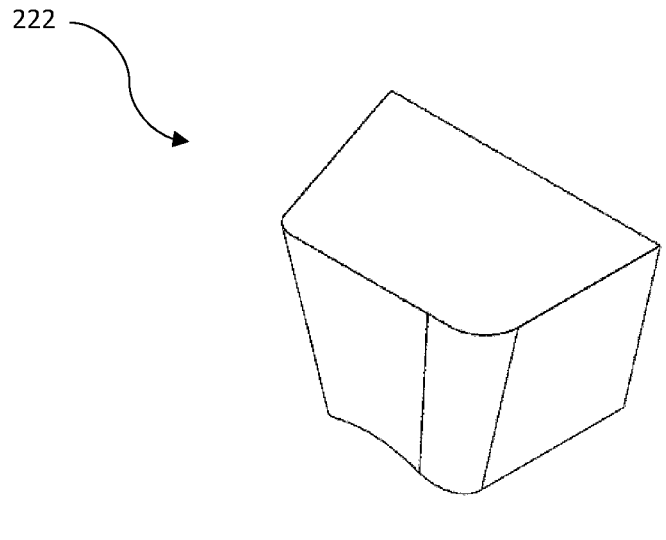
FIG. 23 is a perspective view of one example of an inlet restricting piece, which can be used with an open unit housing in an apparatus according to the presently disclosed subject matter.

FIG. 23 illustrates a perspective view of one example of such inlet restricting piece, in the form of a plug 222 that can be removably mounted to the inlet opening 122 of the housing body portion 221.

As described earlier with reference to FIGS. 5, 7 and 12A to 12C, a side cleaning member can be mounted to a front portion of the outlet opening of the housing body portion for use with the first dosage feeder 31. In some embodiments of the presently disclosed subject matter, for example as shown in FIG. 24C, the housing body portion can include a slot 128 extending along a front portion of the outlet opening and having an opening 128" adjacent to the rear end opening, into which the side cleaning member can be inserted. Such a side cleaning member is not suitable for use with the screw feeder. The open unit housing can further comprise a cleaning member placeholder piece that can be inserted into the slot to prevent material from entering the slot. Once inserted, an inner surface of the cleaning member placeholder piece can constitute a portion of the inner surface of the housing body portion that binds the cavity.

Figure 24A:
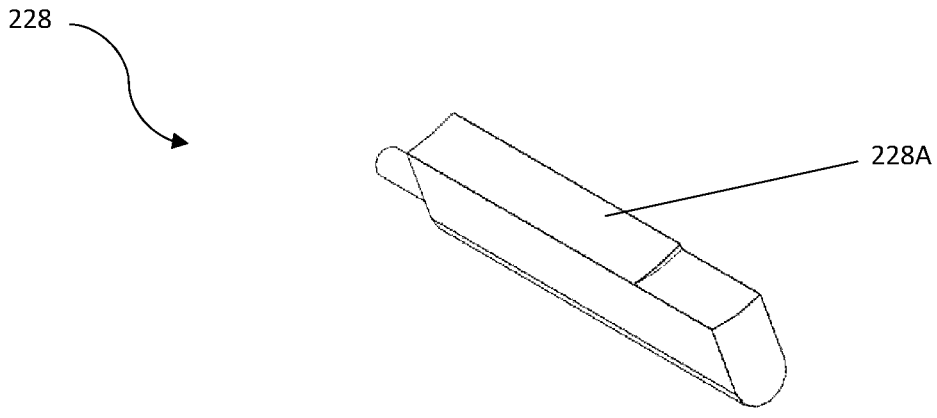
FIG. 24A is a perspective view of a cleaning member placeholder piece, which can be used with an open unit housing in an apparatus according to the presently disclosed subject matter.
Figures 24B, 24C:
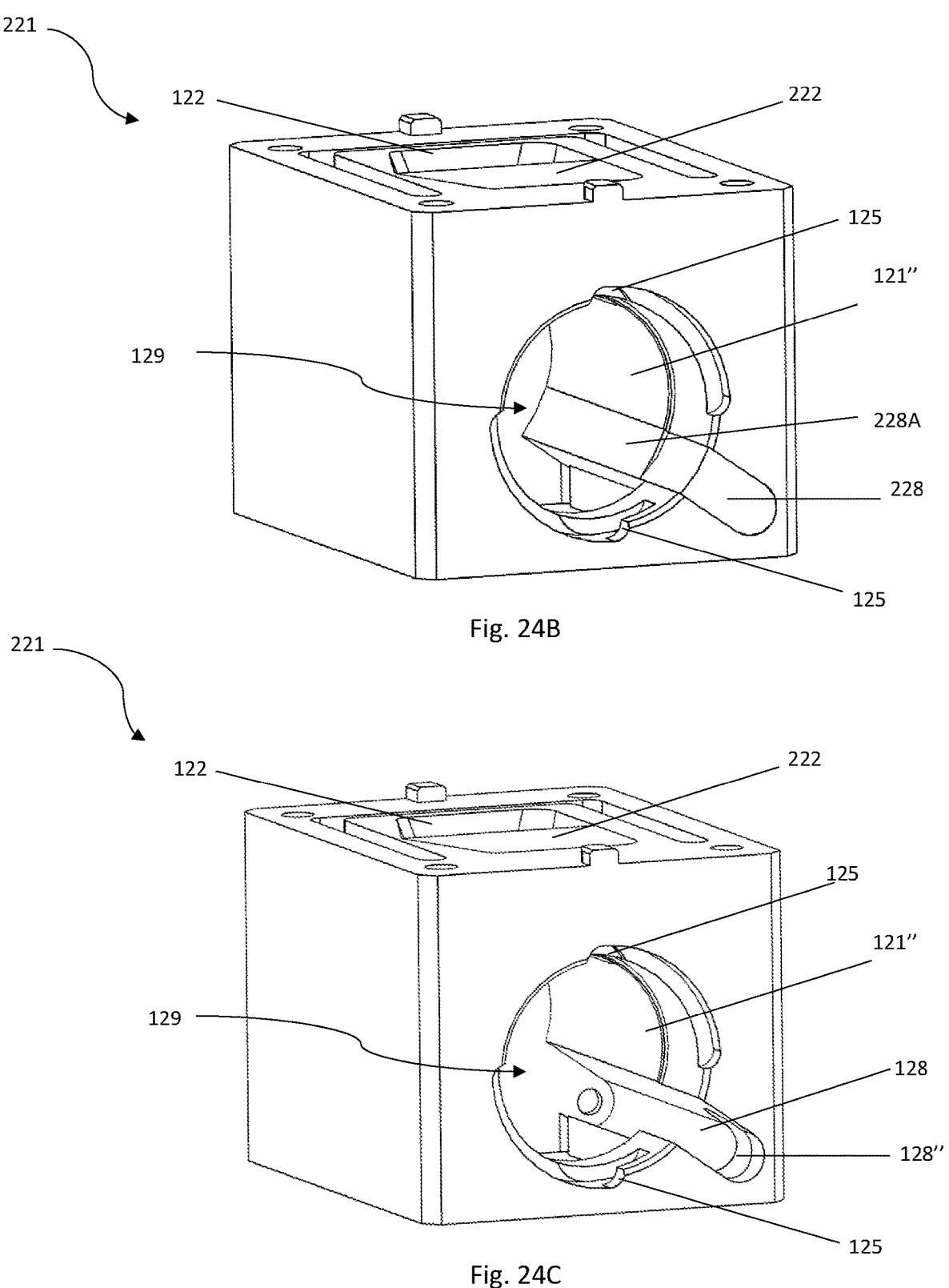
FIG. 24B is a perspective view of a portion of the open unit housing shown in FIG. 19, with a cleaning member placeholder piece shown in FIG. 24A, mounted therein.
FIG. 24C is a perspective view of a portion of the open unit housing shown in FIG. 19, without a cleaning member placeholder piece mounted therein.

FIG. 24A illustrates a perspective view of a cleaning member placeholder piece 228 having an inward facing surface 228A. FIGS. 24B and 24C illustrate a perspective view of the housing body portion 221 shown in FIG. 19, with and without the cleaning member placeholder piece 228 mounted in the slot 128 having an opening 128", respectively. As seen in FIG. 24B, the inward facing surface 228A constitutes a portion of the inner surface that binds the cavity 119.

It should be indicated that systems having features of the presently disclosed subject matter do not necessarily need to look as shown in the drawings and operate as described above. They can also be utilized in a variety of applications, wherein a granulated or powdered chemical material needs to be disposed, in discrete precise metered dosages, into a liquid in order to obtain a chemical solution. Non-liming examples of such applications are the following:

Drinking water treatment process, wherein granulated or powdered chlorine particles are disposed in metered dosages into a flowing water system in order to obtain a constant supply of drinking water;

Pools and swimming pools, which require, chlorine in precise dosages;

Sewage treatment process, wherein granulated or powdered polymers are disposed into liquid sewage pools, during certain stages of the treatment, in order to attach small solid particles, so that a filtration system is capable of collecting and removing all such solid particles from the sewage system;

In a process of diluting fluoride into drinking water systems, which is still in use in many countries;

In the preparation of water-based solutions for industrial purposes.

In addition, it needs to be noted that the above description and enclosed schematic drawings, do not include routine details of the system that are normally present in technical/production drawings, such as e.g. electrical connections and their associated standard elements, securing, fixation and fastening elements, and the like, whose presence and possible location would be clear to a skilled person. For example, it is not described or shown how each element that requires electrical power is connected to an internal power source or external power source, such as one or more batteries, individually or all together. In the latter case, all electrical connections of the system can be connected together through the closed unit housing 41 to a central control unit (not shown).

The invention claimed is:

1. An apparatus for dosaging a particulate chemical material configured for being mounted above a body of a liquid material for further mixture and dissolution of said chemical material in said liquid material, the apparatus comprising at least in operation:

(i) a cavity having an inlet opening facing upwardly for receiving the chemical material from an external source, an outlet opening for disposing therethrough dosages of said chemical material;

(ii) a dosage feeder rotatably located inside said cavity and having at least one dosage-forming surface for forming dosages of said material to be moved, during the rotation of the dosage feeder, towards the outlet opening for disposing dosages therethrough, the dosage feeder further having at least one outlet-closing surface configured to take a plurality of position during said rotation, wherein in one of which positions one of the at least one outlet-closing surface is aligned with the outlet opening preventing exposure of the at least one dosage forming surface to the exterior of the apparatus;

(iii) a position indicator disposed outside the cavity and indirectly connected to the dosage feeder, for producing signals indicative of position of said at least one outlet-closing surface at least with respect to said outlet opening, the position indicator comprising a reference member having a reference area configured and disposed so that the position of the reference area is correlated with the position of said at least one outlet-closing surface during the movement of the dosage feeder; and a sensor for sensing the position of the reference area and providing said signals;

(iv) a driving member connected with, and configured for rotating the dosage feeder so that the reference member is rotatable by the driving member when said driving member rotates the dosage feeder; and (v) a controller configured to receive said signals and to operate the apparatus using said signals.

2. An apparatus according to claim 1, wherein the controller is configured for using said signals for at least one or more of the following in any combination thereof:

monitoring precise position of the at least one outlet-closing surface; or pausing the rotation of the dosage feeder in such a position that the at least one outlet-closing surface prevents the exposure of the at least one dosage forming surface to the exterior of the apparatus, or determining a precise count of dosages disposed through the outlet opening; or monitoring a change in a rate of the rotation of the dosage feeder.

3. An apparatus according to claim 1, wherein said dosage feeder comprises a front moving member configured to be detachably connected to said driving member.

4. An apparatus according to claim 3, wherein said dosage feeder is constituted by a screw feeder having a longitudinal axis, said cavity inlet and outlet openings being spaced along said longitudinal axis, said screw feeder comprising;

a shaft having a front and a rear end and a shaft outer surface, said front end being associated with said cavity inlet opening and being connected to or constituting the front moving member, and said rear end being associated with said cavity outlet opening, a continuous spiral flight extending along at least a portion of the shaft and having a front and a rear end portion adjacent the front and rear end of the shaft, respectively, said continuous spiral flight comprising at least one flight portion, corresponding to a full turn of the spiral flight along the shaft, wherein said at least one dosage-forming surface is constituted by the at least one flight portion and the outer surface of the shaft extending therealong, and said at least one outlet-closing surface comprises a plate located at the rear end portion of the continuous spiral flight, and having a shape configured to close said outlet opening when the plate is aligned therewith.

5. An apparatus according to claim 4, wherein the shaft, the continuous spiral flight and the plate are formed as a unitary body.

6. An apparatus according to claim 4, wherein the at least one outlet-closing surface at least partially bounds the at least one dosage-forming surface.

7. An apparatus according to claim 6, wherein said front moving member is formed as a unitary body with said screw feeder.

8. An apparatus according to claim 3, further comprising an open unit housing configured to accommodate components of the apparatus whose operation is associated with exposure thereof to ambient conditions, said open unit housing comprising a housing body portion having an interior surface defining said cavity, a housing front end and an axially opposite housing rear end, the front and rear ends having inner surfaces that bind said cavity, said housing rear end having a rear opening configured to allow mounting of said dosage feeder therethrough into said cavity, said housing front end having a front opening configured to allow the front moving member of said dosage feeder to extend therethrough to be connected to said driving member.

9. An apparatus according to claim 8, wherein said open unit housing further comprises a cover configured to at least partially seal said rear opening, said cover having a cover inner surface at least partially constituting said inner surface of said housing rear end, and the cover being configured to freely receive a rear moving member of said dosage feeder.

10. An apparatus according to claim 9, wherein said housing body portion of said open unit housing has an inlet opening and an outlet opening constituting said cavity inlet opening and outlet opening respectively, and the cover comprises said outlet opening.

11. An apparatus according to claim 3, wherein said front moving member is configured to be detachably connected to said driving member in a unique orientation for providing association between said position indicator and said at least one outlet-closing surface.

12. An apparatus according to claim 4, wherein the outlet opening has an arcuate shape and the plate is semicircular.

13. An open unit housing for removably and rotatably mounting therein a dosage feeder of a dosaging apparatus, said dosaging apparatus having a driving member for rotating said dosage feeder within said open unit housing, the dosage feeder having a front moving member and a rear moving member connectable to the driving member for said rotating, said dosaging apparatus being configured for dosaging a particulate chemical material when mounted above a body of a liquid material, with an interior of the open unit housing being exposed to ambient conditions, said open unit housing comprising a housing body portion having:

an interior surface defining a cavity exposed to ambient conditions and having an inlet opening facing upwardly for receiving the chemical material from an external source, and an outlet opening for disposing therethrough dosages of said chemical material; and a front end and an axially opposite rear end, the front and rear ends having inner surfaces that bound said cavity, wherein:

said rear end has a rear opening configured to allow removable mounting of said dosage feeder therethrough into said cavity, and said front end has a front opening configured to allow the front moving member of said dosage feeder to extend therethrough to be connected to said driving member.

14. The open unit housing according to claim 13, wherein said open unit housing has an inlet opening and at least one outlet opening constituting said inlet opening and outlet opening of the cavity, respectively, in at least one manner of assembly of the open unit housing.

15. The open unit housing according to claim 14, further comprising a cover configured to at least partially seal said rear opening, said cover having a cover inner surface at least partially constituting said inner surface of said housing rear end, and the cover being configured to freely receive the rear member of said dosage feeder.

16. The open unit housing of claim 15, wherein the cover comprises said outlet opening.

17. The open unit housing according to claim 14, wherein said open unit housing can be assembled in at least two manners, allowing interchangeable use therein of a first dosage feeder comprising a screw feeder requiring longitudinal spacing between said inlet opening and outlet opening of the cavity, and a second dosage feeder requiring altitudinal spacing between said inlet and outlet opening of the cavity, wherein said open unit housing comprises a lower portion having a bottom opening, and wherein said open unit housing further comprises a first removable plug configured to plug the bottom opening when the first feeder is mounted in the cavity, and a second removable plug configured to plug the rear end opening of the open unit housing when the second feeder is mounted in said cavity, and the bottom opening is unplugged to constitute the outlet opening of the cavity.

18. The open unit housing according to claim 17, wherein the open unit housing further comprises a removable inlet restricting piece configured to cover a portion of said inlet opening of the cavity when the first dosage feeder is mounted therein.

19. The open unit housing according to claim 13, wherein said inlet opening has a predetermined size, and wherein the open unit housing further comprises a removable inlet restricting piece allowing to restrict said predetermined size.

20. The open unit housing according to claim 13, further comprising at least one slot for interchangeably mounting therein a cleaning member and a cleaning member placeholder piece.

\* \* \* \* \*